(12) United States Patent
Cho et al.

(10) Patent No.: US 12,050,754 B2
(45) Date of Patent: Jul. 30, 2024

(54) ELECTRONIC DEVICE INCLUDING MAGNET ARRAY

(71) Applicant: Samsung Electronics Co., Ltd., Suwon-si (KR)

(72) Inventors: Gyuyeong Cho, Suwon-si (KR); Sangil Park, Suwon-si (KR); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/990,233

(22) Filed: Nov. 18, 2022

(65) Prior Publication Data
US 2023/0152933 A1 May 18, 2023

Related U.S. Application Data

(63) Continuation of application No. PCT/KR2022/018333, filed on Nov. 18, 2022.

(30) Foreign Application Priority Data

Nov. 18, 2021 (KR) .................. 10-2021-0159411
Nov. 29, 2021 (KR) .................. 10-2021-0166903

(51) Int. Cl.
*G06F 3/041* (2006.01)
*G06F 1/16* (2006.01)
(Continued)

(52) U.S. Cl.
CPC ............ *G06F 3/046* (2013.01); *G06F 1/1616* (2013.01); *G06F 1/1652* (2013.01); *H04M 1/0268* (2013.01); *G06F 3/03545* (2013.01)

(58) Field of Classification Search
CPC ...... G06F 3/046; G06F 1/1616; G06F 1/1652; G06F 3/03545; H04M 1/0268; H04M 1/0216
(Continued)

(56) References Cited

U.S. PATENT DOCUMENTS

| 11,227,710 B2 | 1/2022 | Good |
| 2016/0091923 A1 | 3/2016 | Morrison et al. |

(Continued)

FOREIGN PATENT DOCUMENTS

| CN | 111459228 A | 7/2020 |
| CN | 112785925 A | 5/2021 |

(Continued)

OTHER PUBLICATIONS

International Search report and written opinion dated Feb. 10, 2023, issued in International Application No. PCT/KR2022/018333.

*Primary Examiner* — Thuy N Pardo
(74) *Attorney, Agent, or Firm* — Jefferson IP Law, LLP

(57) ABSTRACT

An electronic device and method are provided. The electronic device includes a first housing, a second housing, a hinge structure connected to the first housing and the second housing, a flexible display disposed from the first housing across the hinge structure to the second housing, at least one first magnetic member disposed on the first housing, and at least one second magnetic member disposed at a position on the second housing corresponding to a position of the first magnetic member. Each of the first magnetic member and the second magnetic member includes at least one vertical magnet component perpendicular to the flexible display and at least one horizontal magnet component parallel to the flexible display. The at least one vertical magnet component is longer than the at least one horizontal magnet component.

20 Claims, 16 Drawing Sheets

(51) Int. Cl.
*G06F 3/046* (2006.01)
*H04M 1/02* (2006.01)
*G06F 3/0354* (2013.01)

(58) Field of Classification Search
USPC .............................. 345/173, 168, 174, 156
See application file for complete search history.

(56) References Cited

U.S. PATENT DOCUMENTS

| | | | | |
|---|---|---|---|---|
| 2017/0070001 | A1* | 3/2017 | Degner | H01R 13/6205 |
| 2017/0102738 | A1* | 4/2017 | Park | G06F 3/04883 |
| 2017/0208157 | A1 | 7/2017 | Kim et al. | |
| 2017/0241803 | A1 | 8/2017 | Ausserlechner | |
| 2018/0335679 | A1* | 11/2018 | Hashimoto | G02F 1/13338 |
| 2018/0367736 | A1* | 12/2018 | Lombardi | G06F 3/04847 |
| 2019/0200470 | A1 | 6/2019 | Woo | |
| 2019/0369859 | A1* | 12/2019 | McClean | G06F 1/1616 |
| 2020/0185538 | A1* | 6/2020 | Yamazaki | G02F 1/13439 |
| 2020/0379515 | A1 | 12/2020 | Cho et al. | |
| 2021/0341972 | A1* | 11/2021 | Togashi | G06F 1/1652 |
| 2021/0365120 | A1* | 11/2021 | Ooi | G06F 3/0414 |
| 2021/0405702 | A1* | 12/2021 | Hudgins | G06F 1/1622 |
| 2022/0043481 | A1* | 2/2022 | Shin | G06F 1/1641 |
| 2023/0068341 | A1* | 3/2023 | Hudgins | G06F 1/1654 |

FOREIGN PATENT DOCUMENTS

| | | |
|---|---|---|
| CN | 214480736 U | 10/2021 |
| KR | 10-2010-0036526 A | 4/2010 |
| KR | 10-2017-0086369 A | 7/2017 |
| KR | 10-2019-0079128 A | 7/2019 |
| KR | 10-2022-0009856 A | 1/2022 |
| KR | 10-2022-0105563 A | 7/2022 |
| WO | 2020/204214 A1 | 10/2020 |
| WO | 2021/129132 A1 | 7/2021 |

* cited by examiner

ELECTRONIC DEVICE INCLUDING MAGNET ARRAY

CROSS-REFERENCE TO RELATED APPLICATION(S)

This application is a continuation application, claiming priority under § 365(c), of an International application No. PCT/KR2022/018333, filed on Nov. 18, 2022, which is based on and claims the benefit of a Korean patent application number 10-2021-0159411, filed on Nov. 18, 2021, in the Korean Intellectual Property Office, and of a Korean patent application number 10-2021-0166903, filed on Nov. 29, 2021, in the Korean Intellectual Property Office, the disclosure of each of which is incorporated by reference herein in its entirety.

TECHNICAL FIELD

The disclosure relates to an electronic device including a magnet array.

BACKGROUND ART

Advancing information communication technology and semiconductor technology accelerate the spread and use of various electronic devices. In particular, recent electronic devices are being developed to carry out communication while carried on. Further, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling and e-wallet function. Such electronic devices become compact enough for users to carry in a convenient way.

As mobile communication services extend up to multimedia service sectors, the display of the electronic device may be increased to allow the user satisfactory use of multimedia services as well as voice call or text messaging services. Accordingly, a foldable display may be disposed on the entire area of the housing structure separated to be foldable. The above information is presented as background information only to assist with an understanding of the disclosure. No determination has been made, and no assertion is made, as to whether any of the above might be applicable as prior art with regard to the disclosure.

DISCLOSURE

Technical Problem

Electronic devices may receive various inputs from the user through a specific input device (e.g., a stylus pen) connected with the electronic device via wireless communication. The electronic device may identify the position on the electronic device designated by the input device and perform the function corresponding thereto. For example, the electronic device may detect the magnetic field generated from the input device using electro magnetic resonance (EMR) scheme.

When a foldable electronic device is folded, a gap may be formed between the separated housings of the electronic device by the repulsive force. To reduce the gap, magnets may be disposed at two opposite ends of the separated housings. However, the magnetic field generated by the magnets may cause a change in magnetic field in the input device using the electromagnetic induction scheme.

Aspects of the disclosure are to address at least the above-mentioned problems and/or disadvantages and to provide at least the advantages described below. Accordingly, an aspect of the disclosure is to provide an electronic device capable of reducing changes in magnetic field affecting the input device, using a designated magnet array.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device may include a first housing, a second housing, a hinge structure connected to the first housing and the second housing, a flexible display disposed from the first housing across the hinge structure to the second housing, at least one first magnetic member disposed on the first housing, and at least one second magnetic member disposed at a position on the second housing corresponding to a position of the first magnetic member. Each of the first magnetic member and the second magnetic member may include at least one vertical magnet component perpendicular to the flexible display and at least one horizontal magnet component parallel to the flexible display. The at least one vertical magnet component may be longer than the at least one horizontal magnet component.

In accordance with another aspect of the disclosure, an electronic device is provided. The electronic device may include a first housing, a second housing, a hinge structure connected to the first housing and the second housing, a flexible display disposed from the first housing across the hinge structure to the second housing, at least one first magnetic member disposed on the first housing, and at least one second magnetic member disposed at a position on the second housing corresponding to a position of the first magnetic member. Each of the first magnetic member and the second magnetic member may include at least one vertical magnet component perpendicular to the flexible display and at least one horizontal magnet component parallel to the flexible display. The at least one vertical magnet component may be longer than the at least one horizontal magnet component, and a length of the at least one horizontal magnet component may be half a length of another horizontal magnet component.

Advantageous Effects

According to an embodiment of the disclosure, the electronic device may minimize the deviation between variations in magnetic field strength on the magnet array by forming different lengths of the vertical magnet components included in the magnet array.

As described above, as the deviation between variations in magnetic field strength is minimized, it is possible to minimize variations in inductance inside the electronic pen interacting with the electronic device.

As the variation in inductance inside the electronic pen is minimized, the frequency of malfunctions of the electronic device may be minimized.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals may be used to represent the same elements throughout the drawings.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
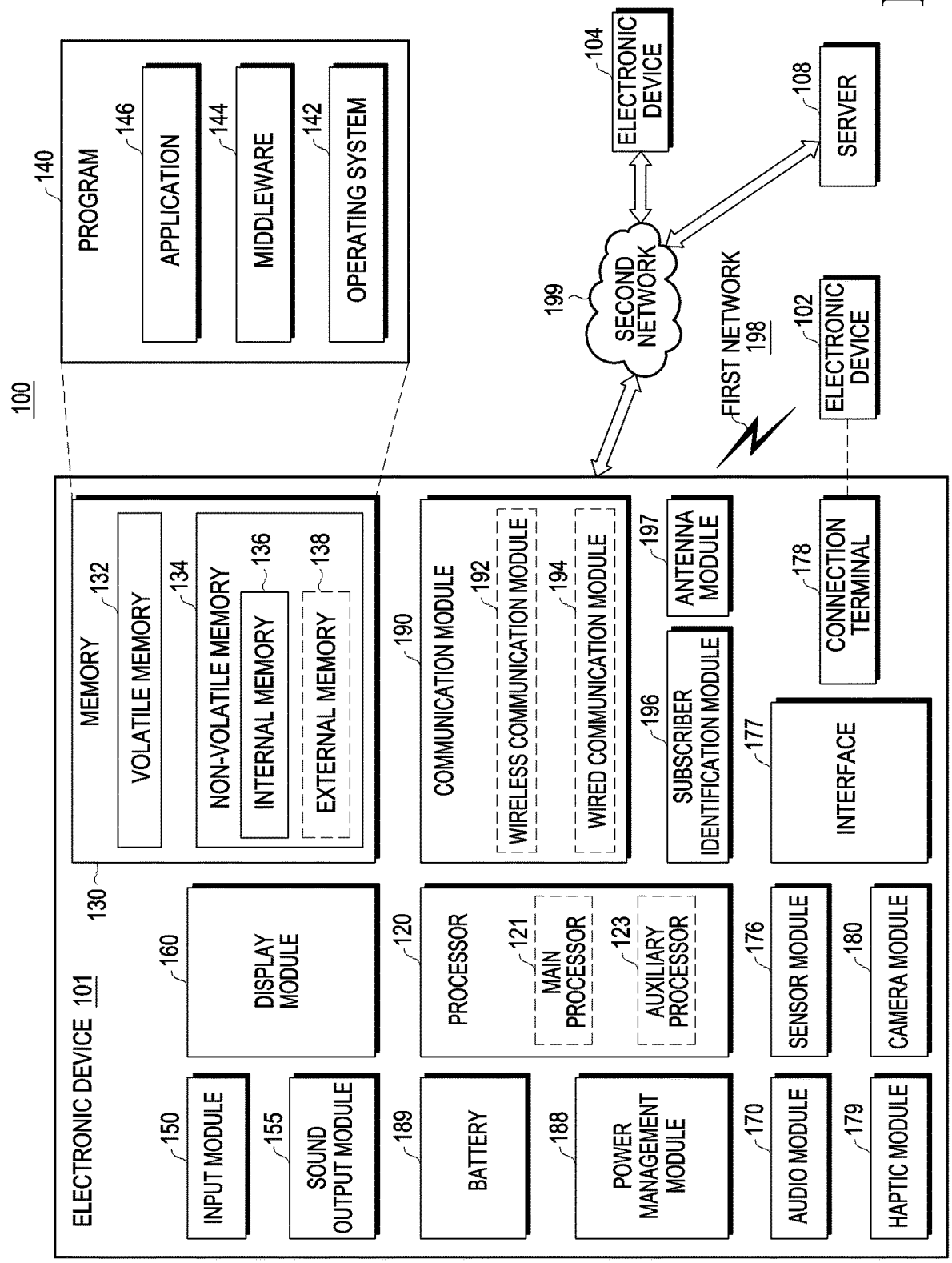
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device (or an input module) 150, a sound output device (or a sound output module) 155, a display device (or a display module) 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting (or connection) terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102 and 104 or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to an embodiment of the disclosure may be one of various types of electronic devices.

The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
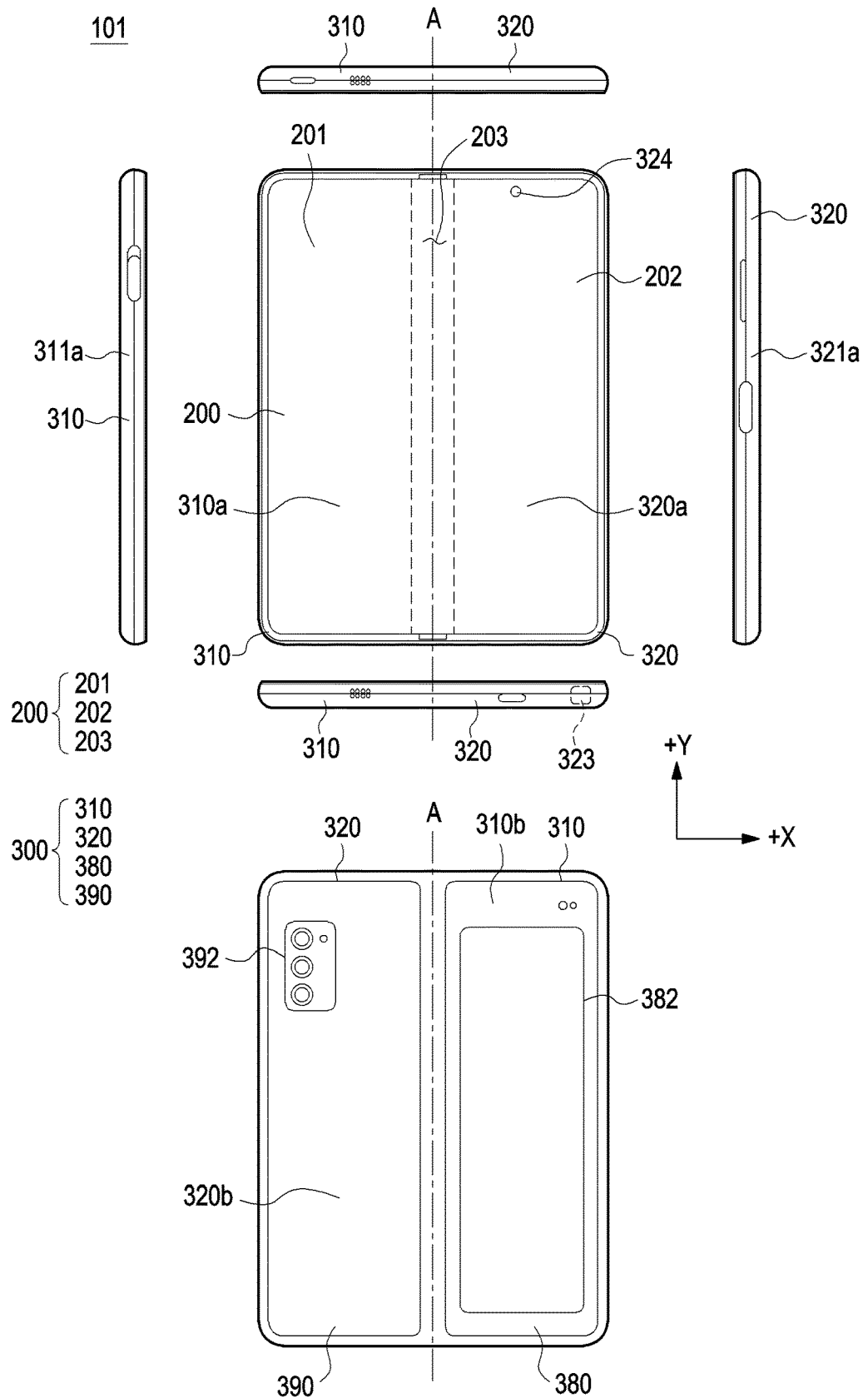
FIG. 2 is a view illustrating an unfolded state of an electronic device according to an embodiment of the disclosure.
Figure 3:
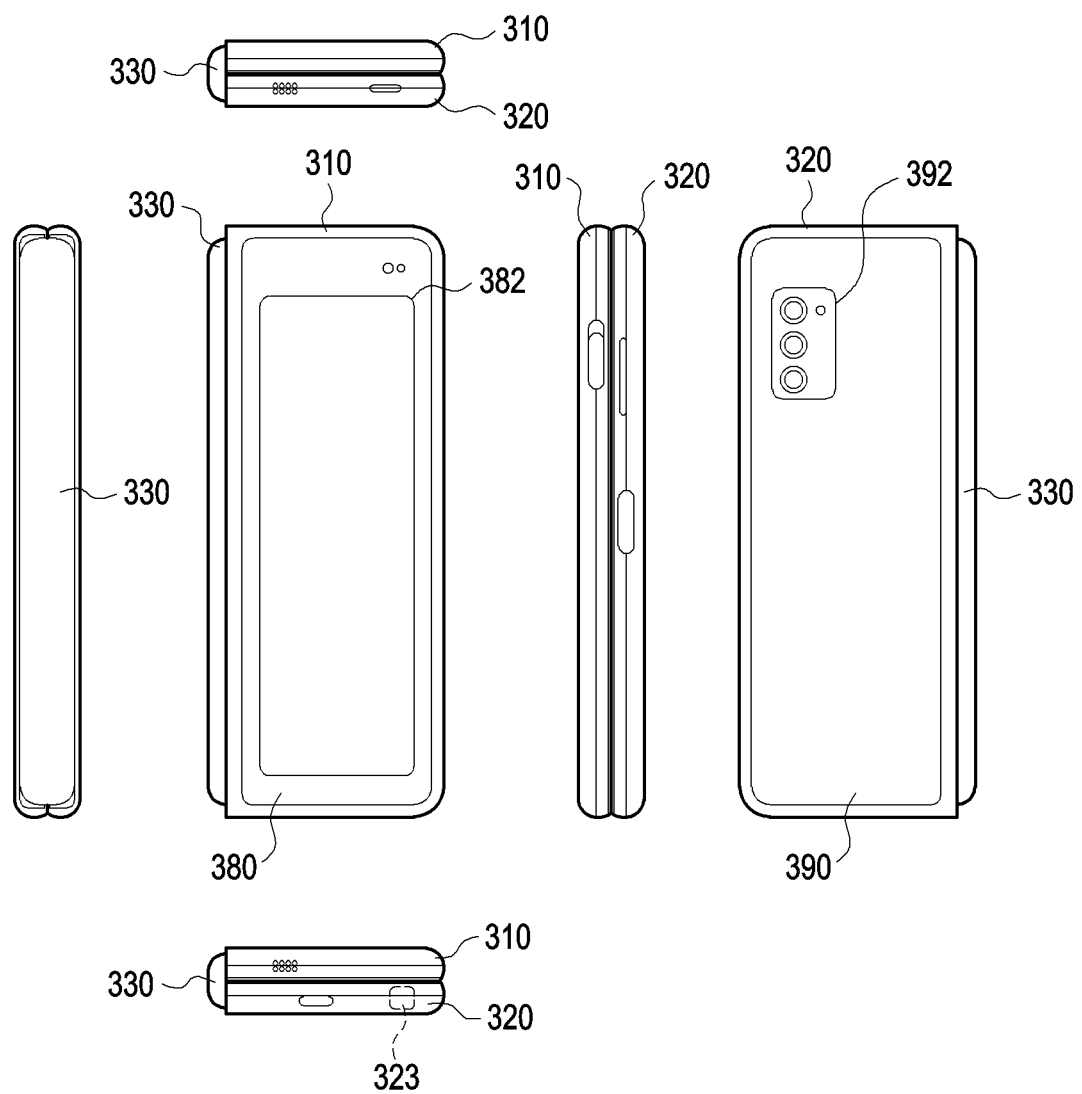
FIG. 3 is a view illustrating a folded state of an electronic device according to an embodiment of the disclosure.
Figure 4:
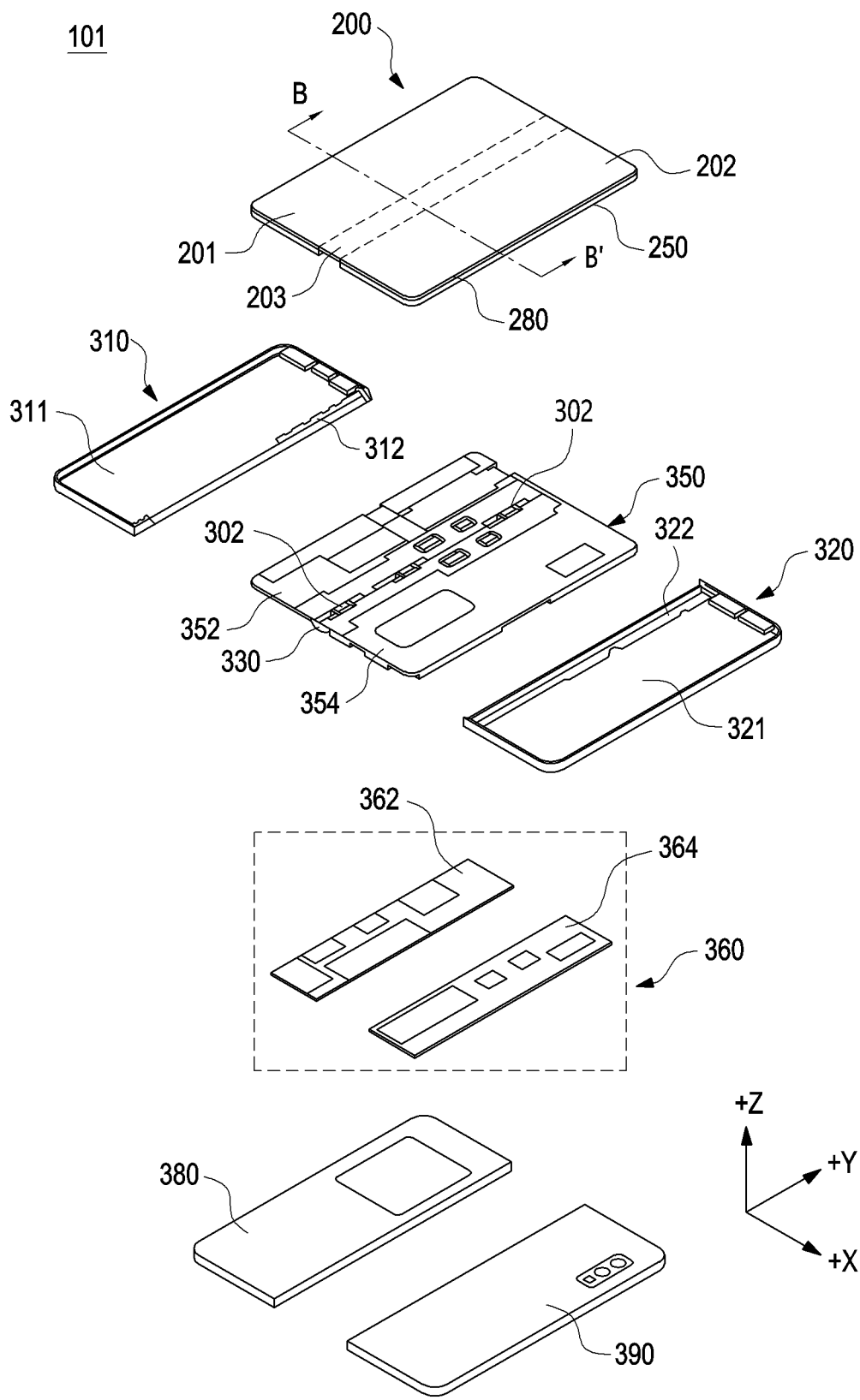
FIG. 4 is an exploded perspective view illustrating an electronic device according to an embodiment of the disclosure.

FIG. 2 is a view illustrating an unfolded state of an electronic device according to an embodiment of the disclosure. FIG. 3 is a view illustrating a folded state of an electronic device according to an embodiment of the disclosure. FIG. 4 is an exploded perspective view illustrating an electronic device according to an embodiment of the disclosure.

Referring to FIGS. 2 and 3, according to an embodiment, an electronic device 101 may include a foldable housing 300, a hinge cover (e.g., the hinge cover 330 of FIG. 3) covering a foldable portion of the foldable housing 300, and a flexible or foldable display 200 (hereinafter, simply "flexible display 200") (e.g., the display device 160 of FIG. 1) disposed in a space formed by the foldable housing 300. According to an embodiment, the surface on which the flexible display 200 is disposed is defined as a front surface (e.g., a first surface 310*a* and a third surface 320*a*) of the electronic device 101. A surface opposite to the front surface is defined as a rear surface (e.g., a second surface 310*b* and a fourth surface 320*b*) of the electronic device 101. A surface surrounding the space between the front and rear surfaces is defined as a side surface (e.g., a first side surface 311*a* and a second side surface 321*a*) of the electronic device 101.

According to an embodiment, the foldable housing 300 may include a first housing 310, a second housing 320 including a sensor area 324, a first rear cover 380, a second rear cover 390, and a hinge structure (e.g., the hinge structure 302 of FIG. 4). The foldable housing 300 of the electronic device 101 are not limited to the shape and coupling shown in FIGS. 2 and 3 but may rather be implemented in other shapes or via a combination and/or coupling of other components. For example, in an embodiment, the first housing 310 and the first rear cover 380 may be integrally formed with each other, and the second housing 320 and the second rear cover 390 may be integrally formed with each other. According to an embodiment, the first housing 310 may be connected to a hinge structure 302 and may include a first surface 310a facing in a first direction and a second surface 310b facing in a second direction opposite to the first direction. The second housing 320 may be connected to the hinge structure 302 and may include a third surface 320a facing in a third direction and a fourth surface 320b facing in a fourth direction opposite to the third direction, and may rotate from the first housing 310 on the hinge structure 302. Thus, the electronic device 101 may turn into a folded state or unfolded state. In the folded state of the electronic device 101, the first surface 310a may face the third surface 320a and, in the unfolded state, the third direction may be identical to the first direction. According to an embodiment, in the unfolded state of the electronic device 101, the first direction and the third direction may be the +Z direction, and the second direction and the fourth direction may be the −Z direction. According to an embodiment, in the folded state of the electronic device 101, the first direction and the fourth direction may be the +Z direction, and the second direction and the third direction may be the −Z direction. Hereinafter, unless otherwise mentioned, directions are described based on the unfolded state of the electronic device 101.

According to an embodiment, the first housing 310 and the second housing 320 are disposed on both sides of the folding axis A and be overall symmetrical in shape with respect to the folding axis A. As set forth below, the first housing 310 and the second housing 320 may have different angles or distances formed therebetween depending on whether the electronic device 101 is in the unfolded, folded, or intermediate state. According to an embodiment, the second housing 320 further includes the sensor area 324 where various sensors are disposed, unlike the first housing 310 but, in the remaining area, the second housing structure 320 may be symmetrical in shape with the first housing structure 310.

According to an embodiment, the electronic device 101 may include a structure into which a digital pen (e.g., the electronic pen 1000 of FIG. 5) may be inserted. For example, a hole 323 into which the digital pen 1000 may be inserted may be formed in a side surface of the first housing 310 or a side surface of the second housing 320 of the electronic device 101. The digital pen 1000 may be inserted into the hole 323.

According to an embodiment, as shown in FIG. 2, the first housing 310 and the second housing 320 together may form a recess to receive the flexible display 200. In an embodiment, due to the sensor area 324, the recess may have two or more different widths in the direction perpendicular to the folding axis A.

According to an embodiment, the recess may have a first width w1 between a first portion 310-1 of the first housing 310, which is parallel with the folding axis A, and a third portion 320-1 of the second housing 320, which is formed at an edge of the sensor area 324. The recess may have a second width w2 formed by a second portion 310-2 of the first housing 310 and a fourth portion 320-2 of the second housing 320, which does not correspond to the sensor area 324 and is parallel with the folding axis A. In this case, the second width w2 may be longer than the first width w1. As another example, the first portion 310-1 of the first housing 310 and the third portion 320-1 of the second housing 320, which are asymmetrical with each other, may form the first width w1 of the recess, and the second portion 310-2 of the first housing 310 and the fourth portion 320-2 of the second housing 320, which are symmetrical with each other, may form the second width w2 of the recess. In an embodiment, the third portion 320-1 and fourth portion 320-2 of the second housing 320 may have different distances from the folding axis A. The width of the recess is not limited thereto. According to an embodiment, the recess may have a plurality of widths due to the shape of the sensor area 324 or the asymmetric portions of the first housing 310 and the second housing 320.

According to an embodiment, the first housing 310 and the second housing 320 may at least partially be formed of a metal or non-metallic material with a rigidity selected to support the flexible display 200. At least a portion formed of metal may provide a ground plane of the electronic device 101 and may be electrically connected with a ground line formed on a printed circuit board (e.g., the printed circuit board 360 of FIG. 4).

According to an embodiment, the sensor area 324 may be formed adjacent to a corner of the second housing 320 and to have a predetermined area. However, the placement, shape, or size of the sensor area 324 is not limited to those illustrated. For example, in an embodiment, the sensor area 324 may be provided in a different corner of the second housing 320 or in any area between the top corner and the bottom corner. In an embodiment, components for performing various functions, embedded in the electronic device 101, may be exposed through the sensor area 324 or one or more openings in the sensor area 324 to the front surface of the electronic device 101. In an embodiment, the components may include various kinds of sensors. The sensor may include at least one of, e.g., a front-facing camera, a receiver, or a proximity sensor.

According to an embodiment, the first rear cover 380 may be disposed on one side of the folding axis A on the rear surface of the electronic device 101 and have, e.g., a substantially rectangular periphery which may be surrounded by the first housing 310. Similarly, the second rear cover 390 may be disposed on the opposite side of the folding axis A on the rear surface of the electronic device 101 and its periphery may be surrounded by the second housing 320.

According to an embodiment, the first rear cover 380 and the second rear cover 390 may be substantially symmetrical in shape with respect to the folding axis (axis A). However, the first rear cover 380 and the second rear cover 390 are not necessarily symmetrical in shape. In an embodiment, the electronic device 101 may include the first rear cover 380 and the second rear cover 390 in various shapes. In an embodiment, the first rear cover 380 may be integrally formed with the first housing 310, and the second rear cover 390 may be integrally formed with the second housing 320.

According to an embodiment, the first rear cover 380, the second rear cover 390, the first housing 310, and the second housing 320 may form a space where various components (e.g., a printed circuit board or battery) of the electronic device 101 may be disposed. According to an embodiment, one or more components may be arranged or visually exposed on/through the rear surface of the electronic device 101. For example, at least a portion of a sub display (e.g., the sub display 270 of FIG. 8) may be visually exposed through a first rear surface area 382 of the first rear cover 380. In an embodiment, one or more components or sensors may be visually exposed through a second rear surface area 392 of the second rear cover 390. According to an embodiment, the sensor may include a proximity sensor and/or a rear-facing camera.

According to an embodiment, a front camera exposed to the front surface of the electronic device 101 through one or more openings prepared in the sensor area 324 or a rear camera exposed through a second rear surface area 392 of the second rear cover 390 may include one or more lenses, an image sensor, and/or an image signal processor. The flash 313 may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 101.

Referring to FIG. 3, the hinge cover 330 may be disposed between the first housing 310 and the second housing 320 to hide the internal components (e.g., the hinge structure 302 of FIG. 4). According to an embodiment, the hinge cover 330 may be hidden by a portion of the first housing 310 and second housing 320 or be exposed to the outside depending on the state (e.g., the unfolded state (e.g., flat state) or folded state) of the electronic device 101.

According to an embodiment, as shown in FIG. 2, in the unfolded state of the electronic device 101, the hinge cover 330 may be hidden, and thus not exposed, by the first housing 310 and the second housing 320. As another example, as shown in FIG. 3, in the folded state (e.g., a fully folded state) of the electronic device 101, the hinge cover 330 may be exposed to the outside between the first housing 310 and the second housing 320. As another example, in an intermediate state in which the first housing 310 and the second housing 320 are folded with a certain angle, the hinge cover 330 may be partially exposed to the outside between the first housing 310 and the second housing 320. In this case, however, the exposed area may be smaller than in the fully folded state. According to an embodiment, the hinge cover 330 may include a curved surface.

According to an embodiment, the flexible display 200 may be disposed in a space formed by the foldable housing 300. For example, the flexible display 200 may be seated on a recess formed by the foldable housing 300 and may occupy most of the front surface of the electronic device 101. Thus, the front surface of the electronic device 101 may include the flexible display 200 and a partial area of the first housing 310 and a partial area of the second housing 320, which are adjacent to the flexible display 200. The rear surface of the electronic device 101 may include a first rear cover 380, a partial area of the first housing 310 adjacent to the first rear cover 380, a second rear cover 390, and a partial area of the second housing 320 adjacent to the second rear cover 390.

According to an embodiment, the flexible display 200 may mean a display at least a portion of which may be transformed into a flat or curved surface. According to an embodiment, the flexible display 200 may include a folding area 203, a first area 201 disposed on one side of the folding area 203 (e.g., the left side of the folding area 203 of FIG. 2), and a second area 202 disposed on the opposite side of the folding area 203 (e.g., the right side of the folding area 203 of FIG. 2).

However, the segmentation of the flexible display 200 as shown in FIG. 2 is merely an example, and the flexible display 200 may be divided into a plurality of (e.g., four or more, or two) areas depending on the structure or function of the display 200. For example, in the embodiment illustrated in FIG. 2, the flexible display 200 may be divided into the areas by the folding area 203 or folding axis (axis A) extending in parallel with the y axis but, in an embodiment, the flexible display 200 may be divided into the areas with respect to another folding area (e.g., a folding area parallel with the x axis) or another folding axis (e.g., a folding axis parallel with the x axis). According to an embodiment, the flexible display 200 may be coupled with or disposed adjacent to a touch detection circuit, a pressure sensor capable of measuring the strength (pressure) of touches, and/or a digitizer (e.g., the pen driving circuit 500 of FIG. 5) for detecting a magnetic field-type stylus pen.

According to an embodiment, the length direction of the electronic device 101 may be the Y-axis direction, and the width direction of the electronic device 101 may be the X-axis direction.

According to an embodiment, the first area 201 and the second area 202 may be overall symmetrical in shape with respect to the folding area 203. However, unlike the first area 201, the second area 202 may include a notch depending on the presence of the sensor area 324, but the rest may be symmetrical in shape with the first area 201. In other words, the first area 201 and the second area 202 may include symmetrical portions and asymmetrical portions.

Described below are the operation of the first housing 310 and the second housing 320 and each area of the flexible display 200 depending on the state (e.g., the unfolded state (or flat state) and folded state) of the electronic device 101.

According to an embodiment, when the electronic device 101 is in the unfolded state (flat state) (e.g., FIG. 2), the first housing 310 and the second housing 320 may be disposed to face in the same direction while being angled at 180 degrees therebetween. The surface of the first area 201 and the surface of the second area 202 of the flexible display 200 may be angled at 180 degrees therebetween while facing in the same direction (e.g., forward of the front surface of the electronic device). The folding area 203 may be coplanar with the first area 201 and the second area 202.

According to an embodiment, when the electronic device 101 is in the folded state (e.g., FIG. 3), the first housing 310 and the second housing 320 may be disposed to face each other. The surface of the first area 201 and the surface of the second area 202 of the flexible display 200 may be angled at a small angle (e.g., ranging from 0 degrees to 10 degrees) therebetween while facing each other. At least a portion of the folding area 203 may have a curved surface with a predetermined curvature.

According to an embodiment, when the electronic device 101 is in the intermediate state (folded state) (e.g., FIG. 3), the first housing 310 and the second housing 320 may be disposed at a certain angle therebetween. The surface of the first area 201 of the flexible display 200 and the surface of the second area 202 may form an angle which is larger than the angle in the folded state and smaller than the angle in the unfolded state. The folding area 203 may at least partially have a curved surface with a predetermined curvature and, in this case, the curvature may be smaller than that when it is in the folded state.

Referring to FIG. 4, the electronic device 101 may include a foldable housing 300, a flexible display device 200, and a board unit 360. The foldable housing 300 may include a first housing 310, a second housing 320, a bracket assembly 350, a first rear cover 380, a second rear cover 390, and a hinge structure 302.

According to an embodiment, the flexible display 200 may include a display panel 280 and at least one support plate 250 on which the display panel 280 is seated. The support plate 250 may be disposed between the display panel 280 and the bracket assembly 350.

According to an embodiment, the bracket assembly 350 may include a first mid plate 352 and a second mid plate 354. The hinge structure 302 may be disposed between the first mid plate 352 and the second mid plate 354. When viewed from the outside, the hinge structure 302 may be covered by a hinge cover (e.g., the hinge cover 330 of FIG. 3). According to an embodiment, a printed circuit board (e.g., a flexible printed circuit (FPCB)) crossing the first mid plate 352 and the second mid plate 354 may be disposed on the bracket assembly 350.

According to an embodiment, the board unit 360 may include a first circuit board 362 disposed on the first mid plate 352 and a second circuit board 364 disposed on the second mid plate 354. The first circuit board 362 and the second circuit board 364 may be disposed in a space formed by the bracket assembly 350, the first housing 310, the second housing 320, the first rear cover 380, and the second rear cover 390. Components for implementing various functions of the electronic device 101 may be mounted on the first circuit board 362 and the second circuit board 364.

According to an embodiment, the first housing 310 and the second housing 320 may be assembled together to be coupled to two opposite sides of the bracket assembly 350, with the flexible display 200 coupled to the bracket assembly 350. According to an embodiment, the first housing 310 may include a first side member 311 at least partially surrounding the side surface of the first mid plate 352, and the second housing 320 may include a second side member 321 at least partially surrounding the side surface of the second mid plate 354. The first housing 310 may include a first rotation supporting surface 312, and the second housing 320 may include a second rotation supporting surface 322 corresponding to the first rotation supporting surface 312. The first rotation supporting surface 312 and the second rotation supporting surface 322 may include a curved surface corresponding to a curved surface included in the hinge cover 330. According to an embodiment, the first side member 311 may include a first side surface 311a surrounding at least a portion between the first surface 310a and the second surface 310b and perpendicular to the first direction or the second direction. According to an embodiment, the second side member 321 may include a second side surface surrounding at least a portion between the third surface 320a and the fourth surface 320b and perpendicular to the third direction or fourth direction.

According to an embodiment, the first rotation supporting surface 312 and the second rotation supporting surface 322, in the unfolded state of the electronic device 101 (e.g., the electronic device of FIG. 2), may cover the hinge cover 330, allowing the hinge cover 330 to be not or minimally exposed through the rear surface of the electronic device 101. As another example, the first rotation supporting surface 312 and the second rotation supporting surface 322, in the folded state of the electronic device 101 (e.g., the electronic device of FIG. 3), may rotate along the curved surface included in the hinge cover 330, allowing the hinge cover 330 to be maximally exposed through the rear surface of the electronic device 101.

Figure 5:
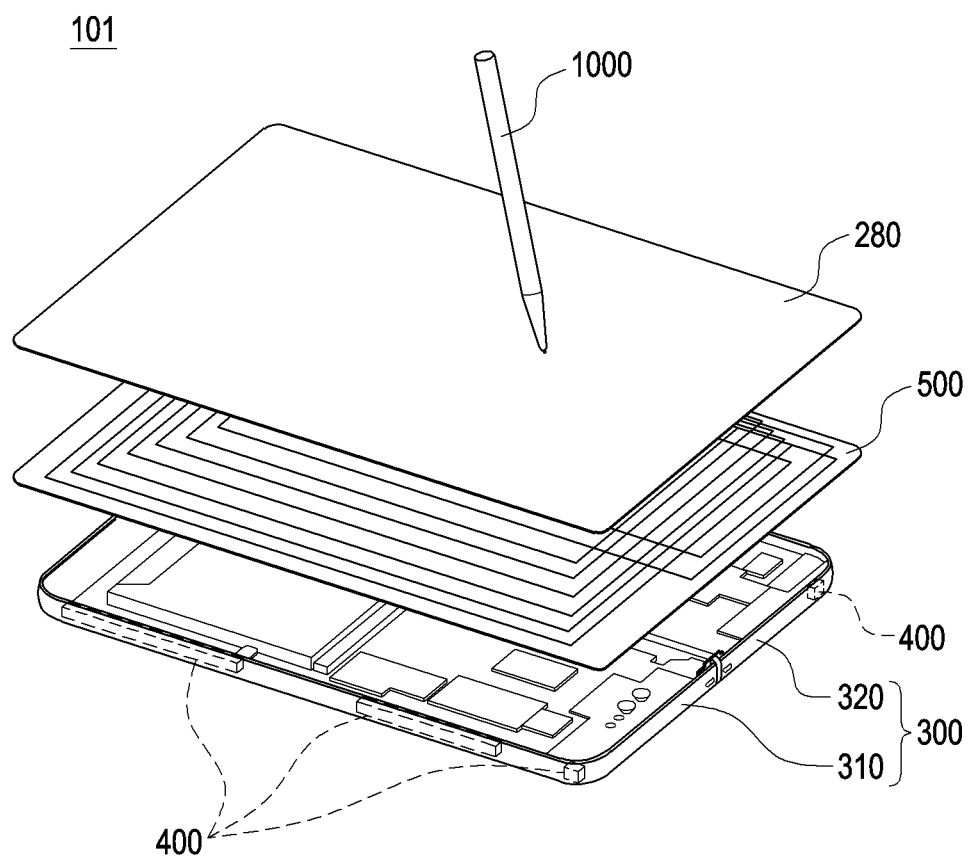
FIG. 5 is an exploded perspective view illustrating an electronic device including a pen driving circuit according to an embodiment of the disclosure.
Figure 6:
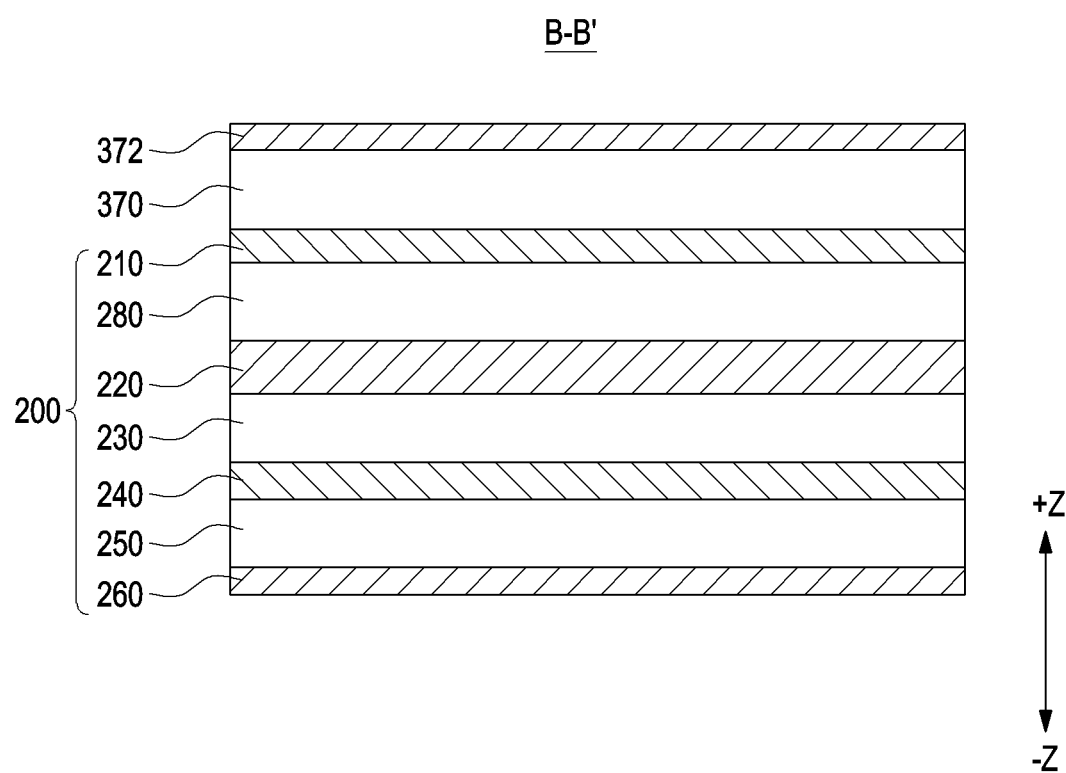
FIG. 6 is a cross-sectional view taken along line B-B' of FIG. 4 according to an embodiment of the disclosure.

FIG. 5 is an exploded perspective view illustrating an electronic device including a pen driving circuit according to an embodiment of the disclosure. FIG. 6 is a cross-sectional view taken along line B-B' of FIG. 4 according to an embodiment of the disclosure.

The display panel 280, the foldable housing 300, the first housing 310, and the second housing 320 illustrated in FIG. 5 may be identical or similar to the display panel 280, the foldable housing 300, the first housing 310, and the second housing 320 illustrated in FIGS. 1 to 4. Accordingly, no description is given of the same components.

Referring to FIGS. 5 and 6, the electronic device 101 may include a flexible display 200, a foldable housing 300, a magnetic member 400, and a pen driving circuit 500. According to an embodiment, the foldable housing 300 may include a window member 370. At least a portion of the window member 370 may be formed of a substantially transparent material. For example, the window member may be formed of ultra-thin glass (UTG) or a polyimide film. The display panel 280 may be exposed to the outside of the electronic device 101 through the window member 370. According to an embodiment, the window member 370 may form at least a portion of the outer surface of the electronic device 101. According to an embodiment, the electronic device 101 may include a coating layer 372 disposed on the window member 370. The coating layer 372 may protect the window member 370 and the flexible display 200 from external impact of the electronic device 101.

According to an embodiment, the flexible display 200 may include components for outputting an image to the outside of the electronic device 101. For example, the flexible display 200 may include at least one of a display panel 280, a polarization film 210 disposed between the display panel 280 and the window member 370, a cushion support layer 220 disposed under the display panel 280, a cushion layer 230 disposed under the cushion support layer 220, a digitizer module 240 disposed under the cushion layer 230, a support plate 250 disposed under the digitizer module 240, and a heat dissipation sheet 260 disposed under the support plate 250.

According to an embodiment, the electronic device 101 may include a pen driving circuit 500 configured to transmit an electromagnetic field signal. For example, the resonance circuit of the electronic pen 1000 connected to the electronic device 101 through a wireless communication module (e.g., the wireless communication module 192 of FIG. 1) may be resonated based on the electromagnetic field signal generated from the pen driving circuit 500 of the electronic device 101. For example, the resonance circuit of the electronic pen 1000 may radiate an electromagnetic resonance (EMR) input signal by resonance. The electronic device 101 may identify the position of the electronic pen 1000 over the electronic device 101 using the EMR input signal. For example, the electronic device 101 may identify the position of the electronic pen 1000 based on the magnitude of the electromotive force (e.g., output voltage) generated by the EMR input signal at each of a plurality of channels (e.g., a plurality of loop coils) in the pen driving circuit 500. Although the electronic device 101 and the electronic pen 1000 are described as operated based on the EMR scheme, this is merely an example. For example, the electronic device 101 may generate an electrical field-based signal based on an electrically coupled resonance (ECR) scheme.

According to an embodiment, the resonance circuit of the electronic pen 1000 may be resonated by the electric field. The electronic device 101 may identify the electric potential at the plurality of channels (e.g., electrodes) by the resonance of the electronic pen 1000 and may identify the position of the electronic pen 1000 based on the electric potential. The electronic pen 1000 may be implemented in an active electrostatic (AES) scheme, and it will be easily appreciated by one of ordinary skill in the art that it is not limited to a specific kind of implementation. According to an embodiment, the electronic device 101 may detect the electronic pen 1000 based on a variation in capacitance (self-capacitance or mutual capacitance) associated with at least one electrode of the touch panel. In this case, the electronic pen 1000 may not include the resonance circuit.

According to an embodiment, the pen driving circuit 500 may be disposed under the display panel 280. According to an embodiment, the pen driving circuit 500 may be disposed between the cushion layer 230 and the digitizer module 240. According to an embodiment, the pen driving circuit 500 may be disposed between the digitizer module 240 and the support plate 250. According to an embodiment, the pen driving circuit 500, together with the digitizer module 240, may be disposed between the support plate 250 and the heat dissipation sheet 260. According to an embodiment, the pen driving circuit 500 may be disposed under the heat dissipation sheet 260. According to an embodiment, the magnetic member 400 may be disposed on an edge of the electronic device 101. For example, the magnetic member (e.g., the magnetic member 400 of FIG. 5) may be disposed on the edge of the first housing 310 and/or the edge of the second housing 320. According to an embodiment, the digitizer module 240 may be disposed below (e.g., in the −Z direction) the pen driving circuit 500.

According to an embodiment, the magnetic member 400 may reduce the gap between the first housing 310 and the second housing 320 which is formed by the repulsive force generated from the first housing 310 and the second housing 320 when the electronic device 101 is folded. For example, in the folded state of the electronic device 101, the magnetic member 400 disposed in the first housing 310 and the magnetic member 400 disposed in the second housing 320 may form magnetic fields that are directed substantially in the same direction, so that the first housing 310 and the second housing 320 may obtain attractive force.

According to an embodiment, the magnetic member 400 may be formed of various materials. For example, the magnetic member 400 may include neodymium (Nd), iron (Fe), and boron (B).

Figure 7:
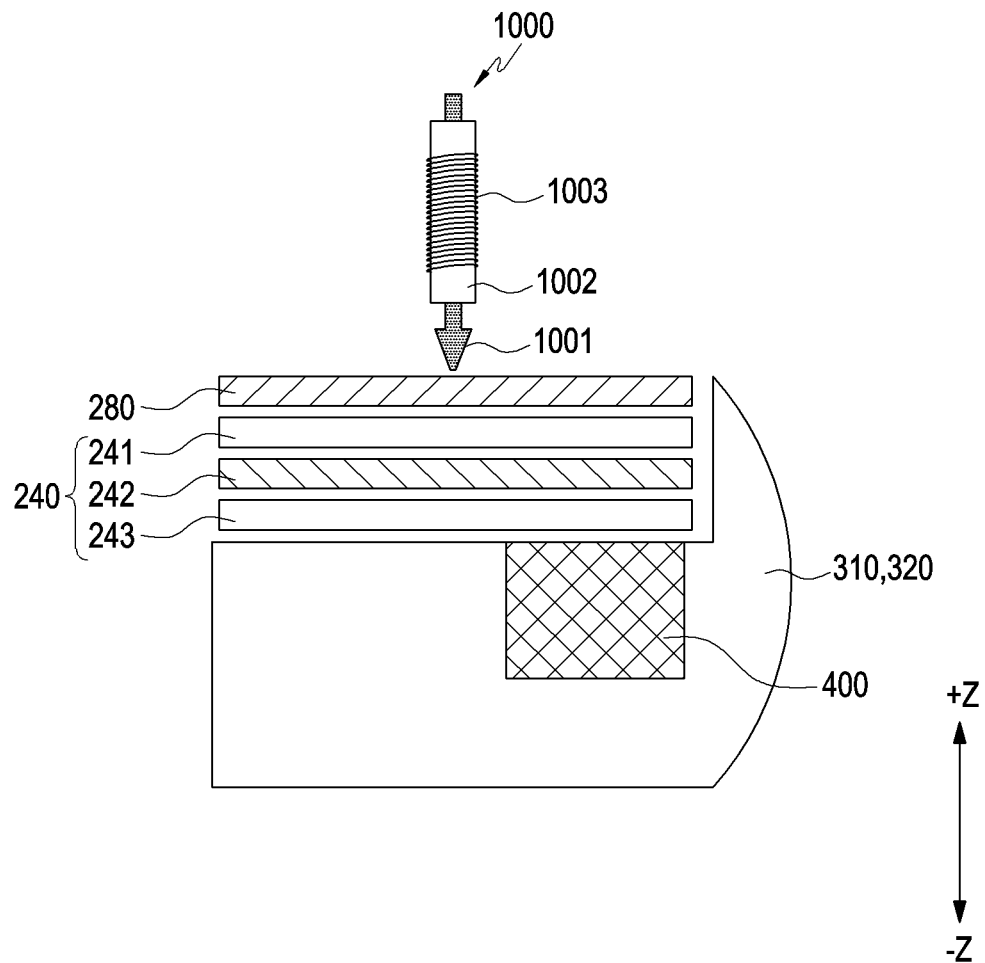
FIG. 7 is a view schematically illustrating a portion of the cross section taken along line B-B' of FIG. 4 according to an embodiment of the disclosure.

FIG. 7 is a view schematically illustrating a portion of the cross section taken along line B-B' of FIG. 4 according to an embodiment of the disclosure.

The digitizer module 240, the display panel 280, the first housing 310, the second housing 320, the magnetic member 400, and the electronic pen 1000 disclosed in FIG. 7 may be identical or similar to the digitizer module 240, the display panel 280, the first housing 310, the second housing 320, the magnetic member 400, and the electronic pen 1000 disclosed in FIGS. 2 to 6. Accordingly, no description is given of the same components.

The coating layer 372, the window member 370, the polarization film 210, the cushion support layer 220, the cushion layer 230, the support plate 250, and the heat dissipation sheet 260 disclosed in FIG. 6 may be omitted from FIG. 7 for convenience of description.

Referring to FIG. 7, according to an embodiment, the electronic pen 1000 may include an electronic pen nib 1001, a ferrite 1002, and a coil 1003.

According to an embodiment, the electronic pen nib 1001 may include a cylinder and a cone formed at one end of the cylinder. The cone of the electronic pen nib 1001 may contact the display panel 280.

According to an embodiment, the ferrite 1002 may be disposed on the outer circumference of the cylinder of the electronic pen nib 1001. The ferrite 1002 may be disposed to surround the outer circumference of the cylinder of the electronic pen nib 1001.

According to an embodiment, the coil 1003 may be disposed on the outer circumference of the ferrite 1002. The coil 1003 may be configured to be wound on the outer circumference of the ferrite 1002 at least once or more. As the coil 1003 is wound around the ferrite 1002, the coil 1003 and the ferrite 1002 may have high magnetic permeability.

According to an embodiment, the magnetic permeability of the ferrite 1002 around which the coil 1003 is wound may be about 45 μH.

According to an embodiment, the display panel 280, the digitizer module 240, and the magnetic member 400 may be disposed in the first housing 310 and/or the second housing 310.

According to an embodiment, a recess may be formed in the first housing 310 and/or the second housing 320. The display panel 280 may be disposed in the recess formed in the first housing 310 and/or the second housing 320. The digitizer module 240 may be disposed in the −Z-axis direction of the display panel 280.

According to an embodiment, the digitizer module 240 may include a digitizer flexible printed circuit board 241, a digitizer shielding sheet 242, and a metal sheet 243.

According to an embodiment, the digitizer flexible printed circuit board 241 may determine the position of the electronic pen 1000 through the signal received from the electronic pen 1000. The digitizer shielding sheet 242 may be configured to reduce the influence by the surrounding magnetic field. The metal sheet 243 may be configured to maintain the rigidity of the display panel 280, the digitizer flexible printed circuit board 241, and/or the digitizer shielding sheet 242. According to an embodiment, the metal sheet 243 may be configured to reduce deformation of the display panel 280 and the digitizer module 240 caused by the external force transferred from the contact between the display panel 280 and the electronic pen 1000. The support plate (e.g., the support plate 250 of FIG. 6) may be referred to as a metal sheet 243.

According to an embodiment, the magnetic member 400 may be disposed on the first housing 310 and/or the second housing 320. The magnetic member 400 may be disposed in the −Z-axis direction of the digitizer module 240. The positions of the magnetic member 400 disposed in the first housing 310 and the magnetic member 400 disposed in the second housing 320 may correspond to each other. According to an embodiment, in the electronic device 101 in the folded or closed state, an attractive force may be exerted between the magnetic member 400 disposed in the first housing 310 and the magnetic member 400 disposed in the second housing 320. Accordingly, the first housing 310 and the second housing 320 may be maintained in the closed state.

Figure 8:
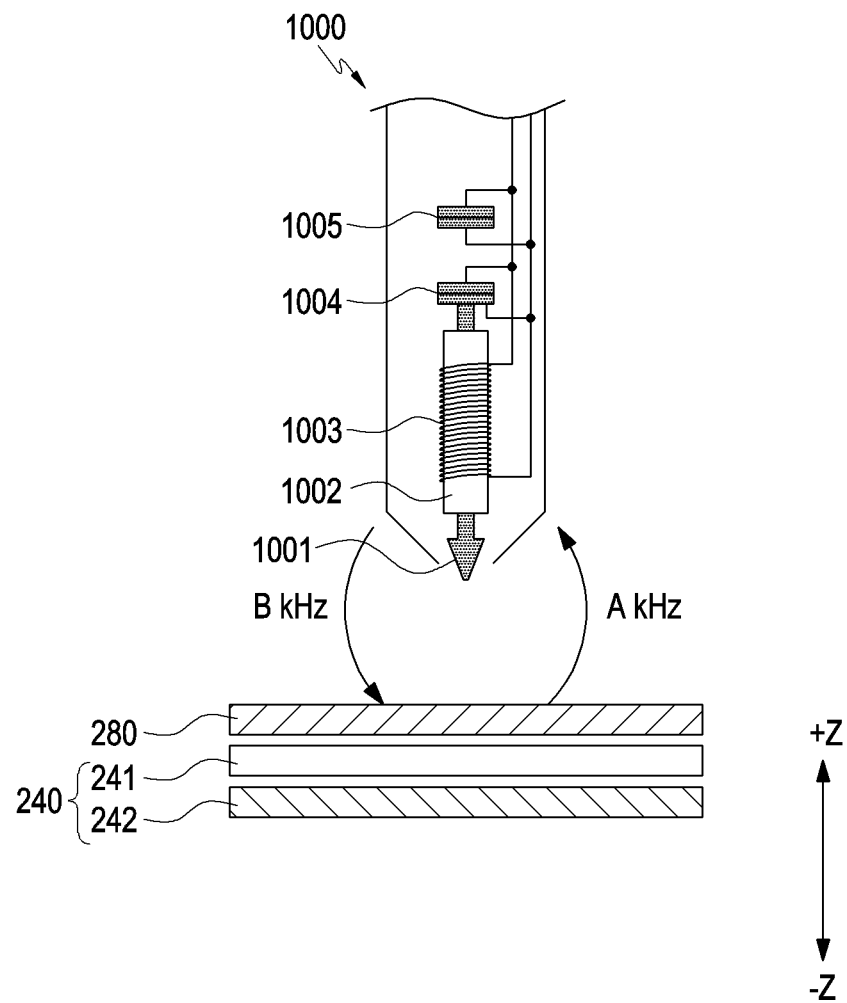
FIG. 8 is a schematic diagram illustrating interactions between an electronic pen and a digitizer module according to an embodiment of the disclosure.

FIG. 8 is a schematic diagram illustrating interactions between an electronic pen and a digitizer module according to an embodiment of the disclosure.

The digitizer module 240, the display panel 280, and the electronic pen 1000 disclosed in FIG. 8 may be identical or similar to the digitizer module 240, the display panel 280, and the electronic pen 1000 disclosed in FIGS. 2 to 7. Accordingly, no description is given of the same components.

Referring to FIG. 8, according to an embodiment, the electronic pen 1000 may include an electronic pen nib 1001, a ferrite 1002, a coil 1003, a variable capacitor 1004, a fixed capacitor 1005, and a switch (not shown). The inductance of the coil 1003 may be L(H). The capacitance of the variable capacitor 1004 may be C1(F). The capacitance of the fixed capacitor 1005 may be C2(F). According to an embodiment, the capacitance of an equivalent capacitor of the switch, variable capacitor 1004 and fixed capacitor 1005 may be C(F).

According to an embodiment, in response to movement according to the pressing of the electronic pen nib 1001, the capacitance of the variable capacitor 1004 may change.

According to an embodiment, when the electronic pen nib 1001 is pressed, the capacitance of the variable capacitor 1004 may be configured to be increased. According to an embodiment, when the electronic pen nib 1001 is pressed, the capacitance of the variable capacitor 1004 may be configured to be reduced. According to an embodiment, the capacitance of the fixed capacitor 1005 may be configured to be fixed. According to an embodiment, the switch included in the electronic pen 1000 may be configured as another variable capacitor. Thus, capacitance may be changed if the switch is shorted or opened.

According to an embodiment, the coil 1003, the variable capacitor 1004, and the fixed capacitor 1005 disposed in the electronic pen 1000 may be electrically connected to each other. As such, the resonant frequency f of the coil 1003, the switch, the variable capacitor 1004, and the fixed capacitor 1005 electrically connected to each other may be $1/(2\pi (L*C)^{\wedge}(1/2))$ Hz.

According to an embodiment, the digitizer module 240 may induce a signal at a constant frequency (e.g., A kHz) to the outside. The circuit composed of the coil 1003, the variable capacitor 1004, and the fixed capacitor 1005 disposed in the electronic pen 1000 receives the signal induced from the digitizer module 240 and resonates with the resonant frequency f so that current may flow. As current is flowed by resonating with the resonant frequency f, a signal at the resonant frequency f may be induced from the electronic pen 1000. The digitizer module 240 may receive the signal at the resonant frequency f induced from the electronic pen 1000.

Figure 9:
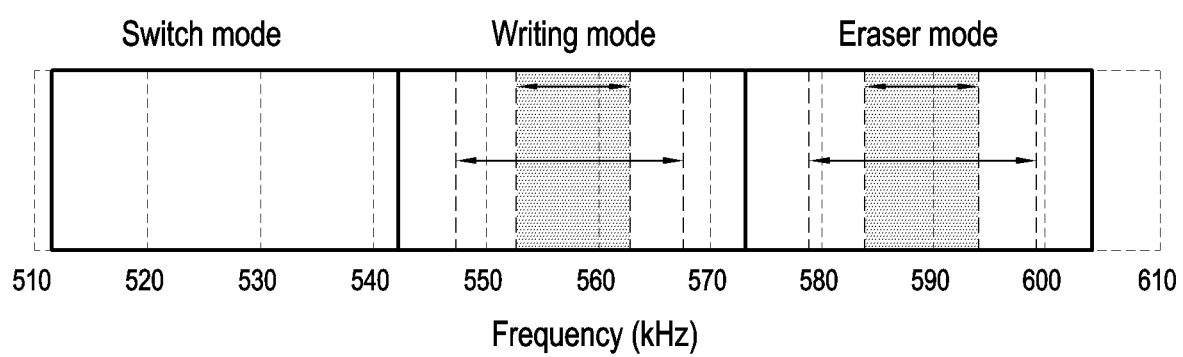
FIG. 9 illustrates functions of an electronic pen depending on resonant frequency ranges according to an embodiment of the disclosure.

FIG. 9 illustrates functions of an electronic pen depending on resonant frequency ranges according to an embodiment of the disclosure.

According to an embodiment, according to the opening or shorting of the switch of the electronic pen (e.g., the electronic pen 1000 of FIG. 8), and a change in the capacitance of the variable capacitor (e.g., the variable capacitor 1004 of FIG. 8), the resonant frequency f of the signal induced from the electronic pen 1000 may be changed. According to an embodiment, the electronic device (e.g., the electronic device 101 of FIG. 1) may be configured to operate differently in each range according to the resonant frequency f. According to an embodiment, the electronic device 101 may recognize a resonant frequency f between about 540 kHz and about 570 kHz as a writing mode. Accordingly, the electronic pen 1000 may be used as a writing instrument. According to an embodiment, the electronic device 101 may recognize a resonant frequency f between about 570 kHz and about 600 kHz as an eraser mode. Accordingly, the electronic pen 1000 may be used as an eraser. According to an embodiment, the electronic device 101 may recognize a resonant frequency f between about 540 kHz and about 570 kHz as a writing mode and may recognize a resonant frequency f between about 570 kHz and about 600 kHz as an eraser mode. The function input to the electronic device 101 may be replaced with another function according to the range of the resonant frequency f. Accordingly, the use of the electronic pen 1000 is not limited to a writing instrument or an eraser.

According to an embodiment, as the electronic pen nib (e.g., the electronic pen nib 1001 of FIG. 8) of the electronic pen 1000 is pressed, the capacitance of the variable capacitor 1004 may be changed, and the resonant frequency f may thus be changed, so that the electronic device 101 may measure the pen pressure of the electronic pen 1000.

According to an embodiment, the value of the inductance of the coil (e.g., the coil 1003 of FIG. 8) of the electronic pen 1000 may be changed by the surrounding magnetic field. To respond to the change in the value of the inductance of the coil 1003 as described above, the electronic device 101 may calibrate the received frequency range, and the electronic device 101 may recognize the input as an input corresponding to the user's intention.

Figure 10A:
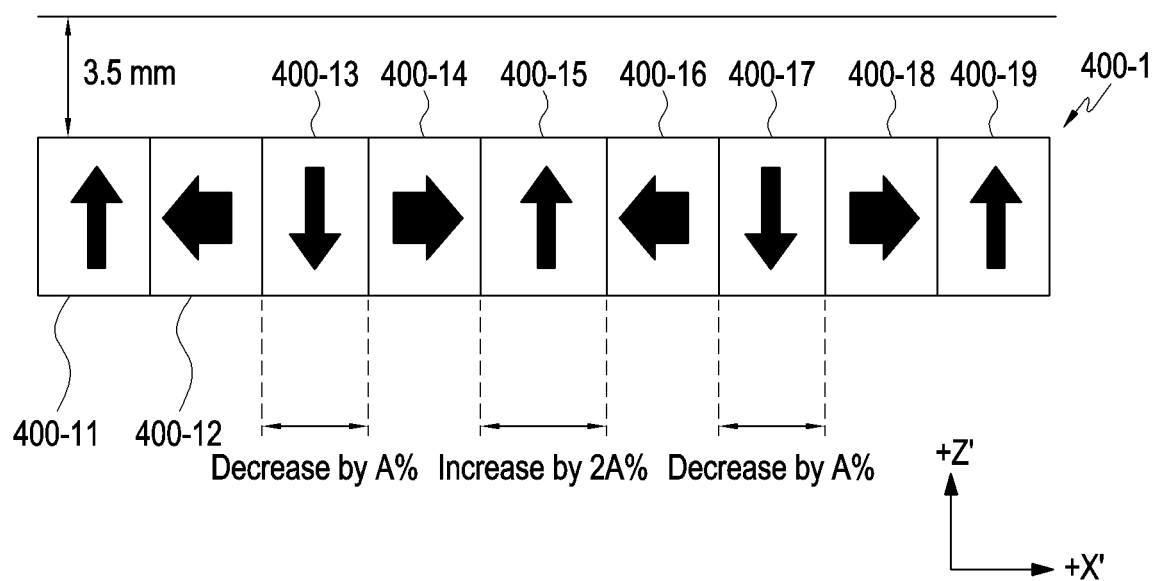
FIG. 10A illustrates a magnet array according to an embodiment of the disclosure.
Figure 10B:
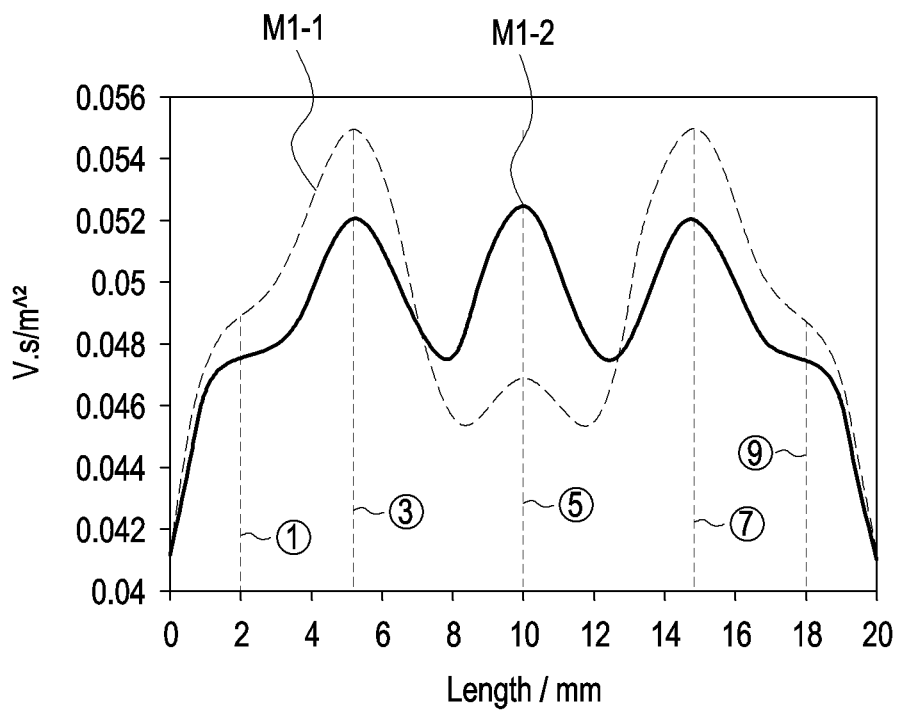
FIG. 10B illustrates a variation in magnetic field strength in a position spaced apart from a magnet array by a predetermined distance according to an embodiment of the disclosure.
Figure 10C:
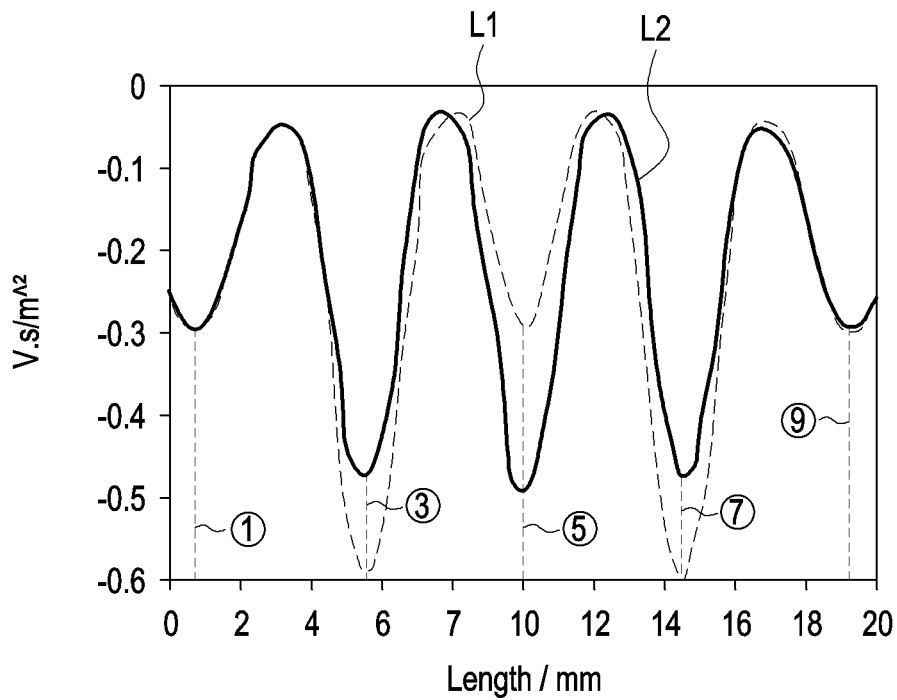
FIG. 10C illustrates a variation in the inductance of an electronic pen in a position spaced apart from a magnet array by a predetermined distance according to an embodiment of the disclosure.
Figure 10D:
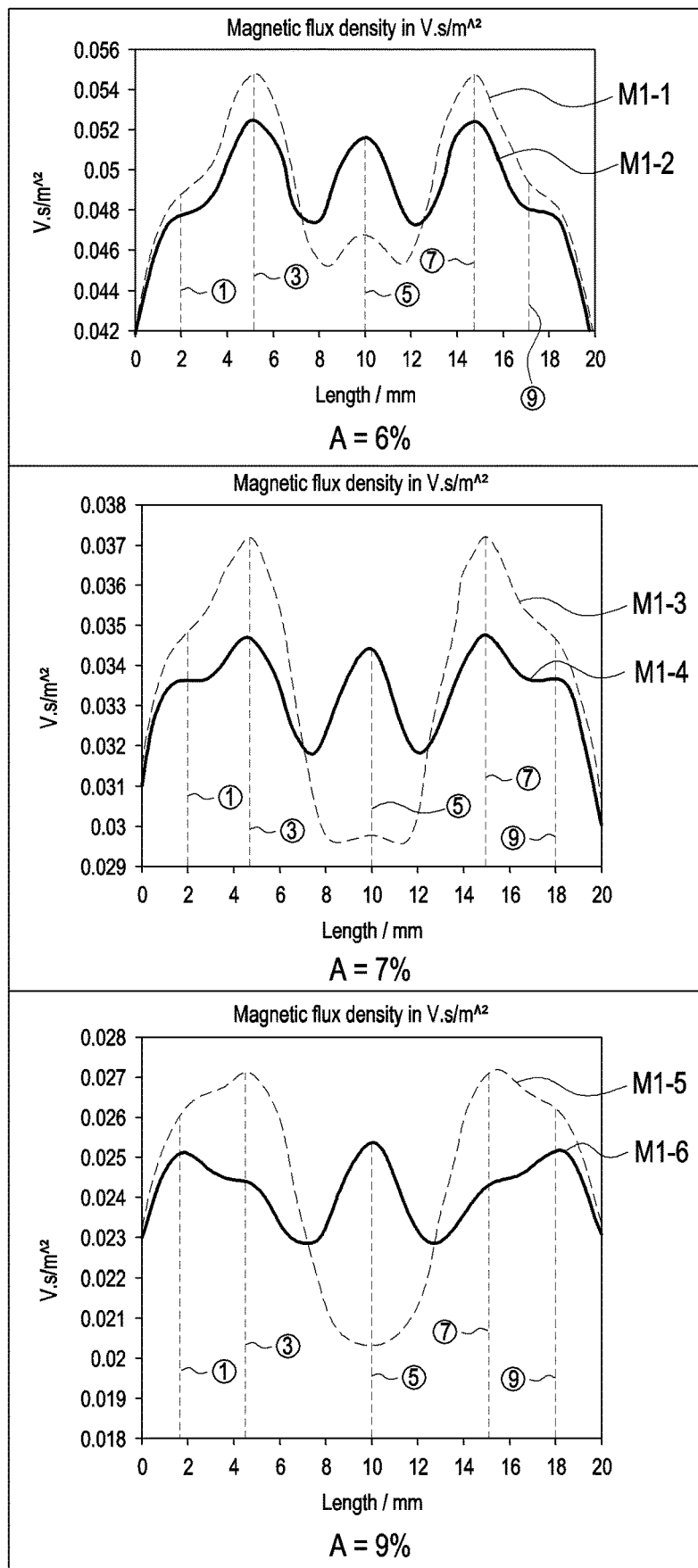
FIG. 10D illustrates a variation in a magnetic field of the magnet array according to an embodiment of the disclosure.

FIG. 10A illustrates a magnet array according to an embodiment of the disclosure. FIG. 10B illustrates a variation in magnetic field strength in a position spaced apart from a magnet array by a predetermined distance according to an embodiment of the disclosure. FIG. 10C illustrates a variation in the inductance of an electronic pen in a position spaced apart from a magnet array by a predetermined distance according to an embodiment of the disclosure. FIG. 10D illustrates a variation in a magnetic field of the magnet array according to an embodiment of the disclosure.

The first magnet array 400-1 disclosed in FIGS. 10A, 10B, 10C, and 10D may be one of the embodiments of the magnetic member 400 illustrated in FIGS. 5 and 7, no duplicate description is given below.

Referring to FIGS. 10A, 10B, 10C, and 10D, according to various embodiments of the disclosure, the first magnet array 400-1 may include a 1-1th magnet component 400-11, a 1-2th magnet component 400-12, a 1-3th magnet component 400-13, a 1-4th magnet component 400-14, a 1-5th magnet component 400-15, a 1-6th magnet component 400-16, a 1-7th magnet component 400-17, a 1-8th magnet component 400-18, and a 1-9th magnet component 400-19.

According to an embodiment, the 1-1th magnet component 400-11 may be disposed such that the magnetic field direction is formed in the +Z' axis direction. The 1-2th magnet component 400-12 may be disposed so that the magnetic field direction is formed in the −X' axis direction. The 1-3th magnet component 400-13 may be disposed so that the magnetic field direction is formed in the −Z' axis direction. The 1-4th magnet component 400-14 may be disposed so that the magnetic field direction is formed in the +X' axis direction. The 1-5th magnet component 400-15 may be disposed so that the magnetic field direction is formed in the +Z' axis direction. The 1-6th magnet component 400-16 may be disposed so that the magnetic field direction is formed in the −X' axis direction. The 1-7th magnet component 400-17 may be disposed so that the magnetic field direction is formed in the −Z' axis direction. The 1-8th magnet component 400-18 may be disposed so that the magnetic field direction is formed in the +X' axis direction. The 1-9th magnet component 400-19 may be disposed so that the magnetic field direction is formed in the +Z' axis direction.

According to an embodiment, the lengths in the X' axis direction of the 1-3th magnet component 400-13 and 1-7th magnet component 400-17 may be formed to be A % shorter than the lengths in the X' axis direction of the 1-1th magnet component 400-11, 1-2th magnet component 400-12, 1-4th magnet component 400-14, 1-6th magnet component 400-16, 1-8th magnet component 400-18, and 1-9th magnet component 400-19.

According to an embodiment, the length in the X' axis direction of 1-5th magnet component 400-15 may be formed to be 2*A % longer than the lengths in the X' axis direction of the 1-1th magnet component 400-11, 1-2th magnet component 400-12, 1-4th magnet component 400-14, 1-6th magnet component 400-16, 1-8th magnet component 400-18, and the 1-9th magnet component 400-19. The length change value A of the magnet component is not a fixed value but may vary. According to an embodiment, A may be larger than 0 and less than or equal to 15.

Referring to FIG. 10B, variations in the magnetic field strength M1-1 of a magnet array to which various embodiments of the disclosure are not applied and variations in the magnetic field strength M1-2 of the magnetic field of the first magnet array 400-1 to which an embodiment of the disclosure are applied may be identified. The magnetic field strengths M1-1 and M1-2 were measured in positions about 3.5 mm away from the magnet array and the first magnet array 400-1. The A value of the first magnet array 400-1 in FIG. 10B is about 6%.

In FIG. 10B, the X axis means the position of the measurement performed along the X' axis from the left side of the first magnet array 400-1 in FIG. 10A, and the Y-axis means the magnetic flux density ($V*s/m^2$).

According to an embodiment, ① may correspond to the position of the 1-1th magnet component 400-11, ③ may correspond to the position of the 1-3th magnet component 400-13, ⑤ may correspond to the position of the 1-5th magnet component 400-15, ⑦ may correspond to the position of the 1-7th magnet component 400-17, and ⑨ may correspond to the position of the 1-9th magnet component 400-19.

According to an embodiment, when the magnetic field strength M1-1 and the magnetic field strength M1-2 are compared, the deviation in the magnetic field strength M1-1 of the magnet array may be identified as larger than the deviation in the magnetic field strength M1-2 of the first magnet array 400-1. According to an embodiment, it may be identified that the maximum strength of the magnetic field strength M1-1 of the magnet array occurs at ③ and ⑦, and the magnetic flux density is about 0.054 $V*s/m^2$. It may be identified that the minimum strength of the magnetic field strength M1-1 occurs near ⑤ and the magnetic flux density is about 0.045 $V*s/m^2$. According to an embodiment, the maximum intensity of the magnetic field strength M1-2 of the first magnet array 400-1 occurs at ③, ⑤ and ⑦, and the magnetic flux density is about 0.052 $V*s/m^2$. It may be identified that the minimum strength of the magnetic field strength M1-2 occurs near ⑤, and the magnetic flux density is about 0.047 $V*s/m^2$. As such, according to an embodiment of the disclosure, the difference between the maximum intensity and the minimum intensity of the first magnet array 400-11 may be reduced, and the deviation in the magnetic field intensity of the first magnet array 400-11 may be reduced. Accordingly, the variation in inductance generated in the coil 1003 of the electronic pen 1000 may be reduced, and malfunctions of the electronic device 101 may be reduced.

Referring to FIG. 10C, variations in the inductance of the coil 1003 by the magnet array to which various embodiments of the disclosure are not applied and variations in the inductance of the coil 1003 by the first magnet array 400-1 to which an embodiment of the disclosure are applied may be identified. The inductance was measured in positions about 3.5 mm away from the magnet array and the first magnet array 400-1. The change value A of the length of the magnet component is about 6%.

Referring to FIG. 10C, the variation in the inductance of the coil 1003 of the electronic pen 1000 may be identified. As being positioned adjacent to the magnet, the inductance of the coil 1003 may be reduced, and the value is shown as a negative number by the decrement.

In FIG. 10C, the X axis means the position of measurement performed while moving the electronic pen 1000 along the +X' axis from the leftmost end of the first magnet array 400-1 in FIG. 10A, and the Y axis means the variation μH in the inductance of the coil 1003 varied by the magnet. Such a tendency occurs as if the strength of the magnetic field increases, the inductance of the coil 1003 is greatly reduced and, if the strength of the magnetic field decreases, the inductance of the coil 1003 is less reduced.

According to an embodiment, the variation L1 in the inductance of the coil 1003 of the electronic pen 1000 on the magnet array to which various embodiments of the disclosure are not applied through FIG. 10C and the variation L2 in the inductance of the coil 1003 of the electronic pen 1000 on the first magnet array 400-1 to which an embodiment of the disclosure are applied may be identified.

According to an embodiment, in relation to the variation L1 in inductance, it may be identified that a largest value drop (about −0.6 μH) occurs in the positions ③ and ⑦, and a drop of about −0.3 μH occurs in the position ⑤. In relation to the variation L2 in inductance, it may be identified that similar value drops (about −0.5 μH) occur at ③, ⑤, and ⑦.

According to an embodiment, in the first magnet array 400-1 according to an embodiment of the disclosure, it may be identified that the maximum value of the value drop of the inductance is reduced and that the deviation in value drop decreases. As such, as the deviation in the inductance value drop of the coil 1003 decreases, the possibility of malfunction of the electronic device 101 may decrease.

Referring to FIG. 10D, according to an embodiment, the magnetic field strength variation graphs M1-1 and M1-2 are ones measured in positions about 3.5 mm away from the magnet array and the first magnet array 400-1. The variation A in the magnet component length in the magnetic field strength variation graph M1-1 is 0%, and the variation A in the magnet component length in the magnetic field strength variation graph M1-2 is about 6%. The magnetic field strength variation graphs M1-1 and M1-2 are the same as the graph shown in FIG. 10B. Accordingly, the description of FIG. 10B is applied.

According to an embodiment, the magnetic field strength variation graphs M1-3 and M1-4 are ones measured in the position about 4.0 mm away from the magnetic member 400, and the variation A in magnet component length in the magnetic field strength variation graph M1-3 is 0%, and the variation A in magnet component length in the magnetic field strength variation graph M1-4 is about 7%. The highest value of the magnetic field strength variation graph M1-3 for the magnet array to which the disclosure is not applied is about 0.037 $V*s/m^2$, and the lowest value is about 0.0295 $V*s/m^2$. The highest value of the magnetic field strength variation graph M1-4 for the magnet array 400-1 to which the disclosure is applied is about 0.034 $V*s/m^2$, and the lowest value except for values near two opposite ends is about 0.032 $V*s/m^2$. As such, it may be identified that if the magnet array 400-1 according to an embodiment of the disclosure is applied, the deviation in magnetic field strength variation is reduced.

According to an embodiment, the magnetic field strength variation graphs M1-5 and M1-6 are ones measured in positions about 4.5 mm away from the magnetic member 400. The variation A in the magnet component length in the magnetic field strength variation graph M1-5 is 0%, and the variation A in the magnet component length in the magnetic field strength variation graph M1-6 is about 9%. The highest value of the magnetic field strength variation graph M1-5 for the magnet array to which the disclosure is not applied is about 0.027 $V*s/m^2$, and the lowest value except for values near two opposite ends is about 0.0205 $V*s/m^2$. The highest value of the magnetic field strength variation graph M1-6 for the magnet array 400-1 to which the disclosure is applied is about 0.0255 V*s/m^2, and the lowest value except for values near two opposite ends is about 0.025 V*s/m^2. As such, it may be identified that if the magnet array 400-1 according to an embodiment of the disclosure is applied, the deviation in magnetic field strength variation is reduced.

Figure 11A:
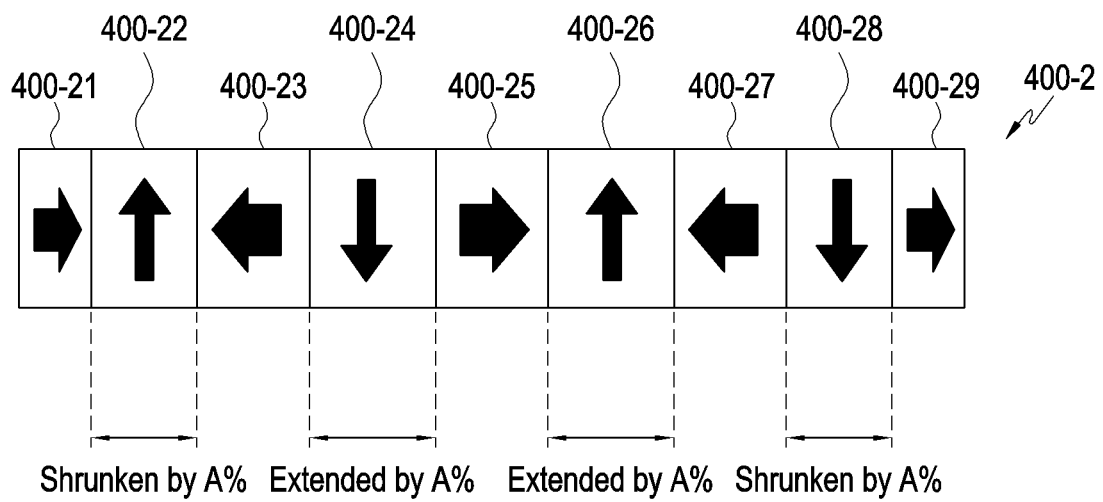
FIG. 11A illustrates a magnet array according to an embodiment of the disclosure.
Figure 11B:
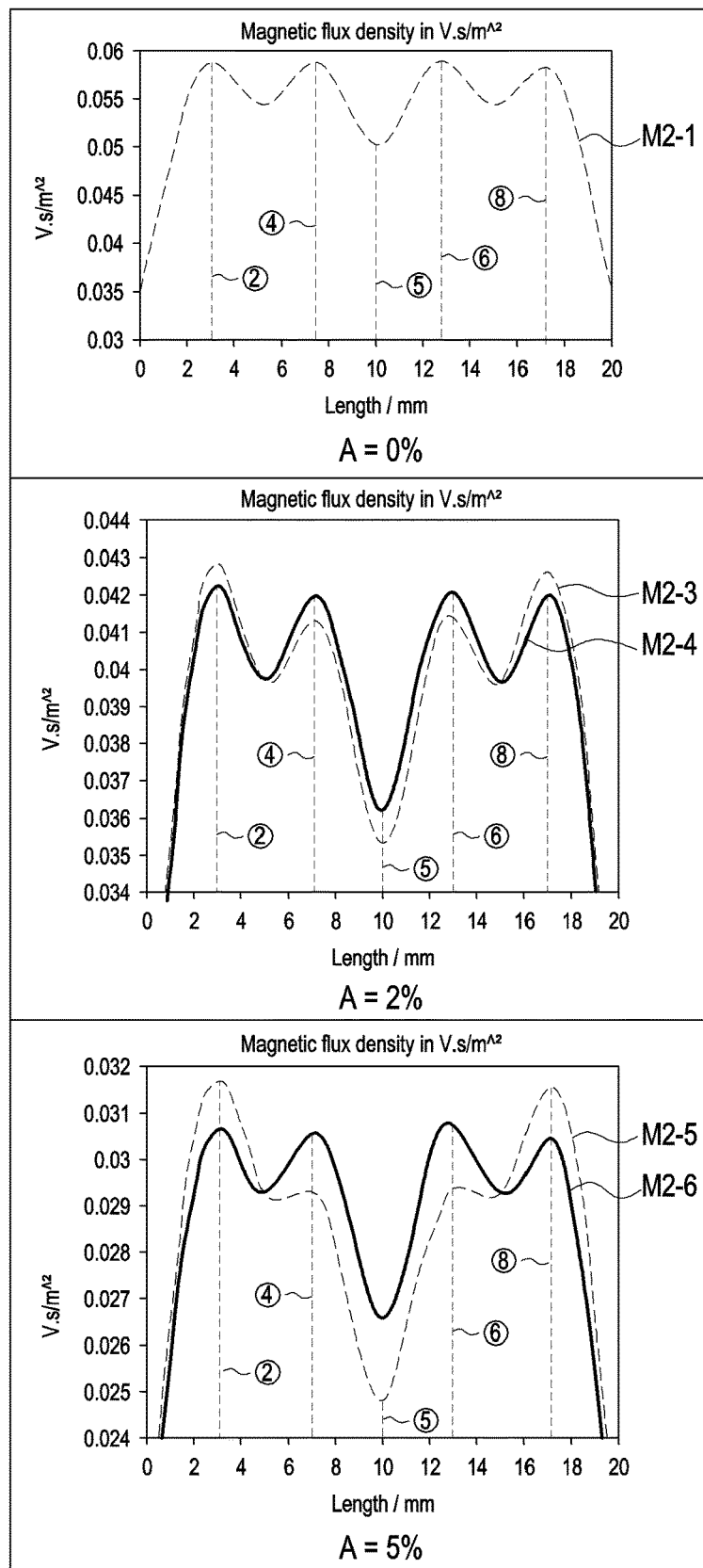
FIG. 11B illustrates a variation in the magnetic field of a magnet array according to an embodiment of the disclosure.

FIG. 11A illustrates a magnet array according to an embodiment of the disclosure. FIG. 11B illustrates a variation in the magnetic field of a magnet array according to an embodiment of the disclosure.

Since a second magnet array 400-2 disclosed in FIG. 11A is one of the embodiments of the magnetic member 400 illustrated in FIGS. 5 and 7, no duplicate description is given below.

Referring to FIG. 11A, according to an embodiment, the second magnet array 400-2 may include a 2-1th magnet component 400-21, a 2-2th magnet component 400-22, a 2-3th magnet component 400-23, a 2-4th magnet component 400-24, a 2-5th magnet component 400-25, a 2-6th magnet component 400-26, a 2-7th magnet component 400-27, a 2-8th magnet component 400-28, and a 2-9th magnet component 400-29.

According to an embodiment, the 2-1th magnet component 400-21 may be disposed such that the magnetic field direction is formed toward the +X' axis direction. The 2-2th magnet component 400-22 may be disposed so that the magnetic field direction is formed toward the +Z' axis direction. The 2-3th magnet component 400-23 may be disposed so that the magnetic field direction is formed toward the −X' axis direction. The 2-4th magnet component 400-24 may be disposed so that the magnetic field direction is formed toward the −Z' axis direction. The 2-5th magnet component 400-25 may be disposed so that the magnetic field direction is formed toward the +X' axis direction. The 2-6th magnet component 400-26 may be disposed so that the magnetic field direction is formed toward the +Z' axis direction. The 2-7th magnet component 400-27 may be disposed so that the magnetic field direction is formed toward the −X' axis direction. The 2-8th magnet component 400-28 may be disposed so that the magnetic field direction is formed toward the −Z' axis direction. The 2-9th magnet component 400-29 may be disposed so that the magnetic field direction is formed toward the +X' axis direction.

According to an embodiment, the lengths in the X' axis direction of the 2-2th magnet component 400-22 and 2-8th magnet component 400-28 may be formed to be A % shorter than the lengths in the X' axis direction of the 2-3th magnet component 400-23, 2-5th magnet component 400-25, and 2-7th magnet component 400-27.

According to an embodiment, the lengths in the X' axis direction of 2-4th magnet component 400-24 and 2-6th magnet component 400-26 may be formed to be A % longer than the lengths in the X' axis direction of the 2-3th magnet component 400-23, 2-5th magnet component 400-25, and 2-7th magnet component 400-27. A may be larger than 0 and less than or equal to 15.

According to an embodiment, the lengths in the X' axis direction of the 2-1th magnet component 400-21 and 2-9th magnet component 400-29 may be half of the lengths in the X' axis direction of the 2-3th magnet component 400-23, 2-5th magnet component 400-25, and 2-7th magnet component 400-27.

Referring to FIG. 11B, according to an embodiment, the magnetic field strength variation graph M2-1 is one measured in the position about 3.5 mm away from the magnet array 400-2. The variation A in the magnet component length in the magnetic field strength variation graph M1-1 is 0%.

According to an embodiment, ② may correspond to the position of the 2-2th magnet component 400-22, ④ may correspond to the position of the 2-4th magnet component 400-24, ⑤ may correspond to the position of the 2-5th magnet component 400-25, ⑥ may correspond to the position of the 2-6th magnet component 400-26, and ⑧ may correspond to the position of the 2-8th magnet component 400-28.

According to an embodiment, the magnetic field strength variation graphs M2-3 and M2-4 are ones measured in the position about 4.0 mm away from the magnetic member 400, and the variation A in magnet component length in the magnetic field strength variation graph M2-3 is 0%, and the variation A in magnetic field length the length in the magnetic field strength variation graph M2-4 is about 2%. The highest value of the magnetic field strength variation graph M2-3 for the magnet array to which the disclosure is not applied is about 0.043 V*s/m^2 in positions ② and ⑧, and the lowest value except for values near two opposite ends is about 0.035 V*s/m^2 in position ⑤. The highest value of the magnetic field strength variation graph M2-4 for the magnet array 400-2 to which the disclosure is applied is about 0.042 V*s/m^2 in positions ② and ⑧, and the lowest value except for values near two opposite ends is about 0.036 V*s/m^2 in position ⑤. As such, it may be identified that if the magnet array 400-2 according to an embodiment of the disclosure is applied, the deviation in magnetic field strength variation is reduced.

According to an embodiment, the magnetic field strength variation graphs M2-5 and M2-6 are ones measured in positions about 4.5 mm away from the magnetic member 400. The variation A in the magnet component length in the magnetic field strength variation graph M2-5 is 0%, and the variation A in the magnet component length in the magnetic field strength variation graph M2-6 is about 5%. The highest value of the magnetic field strength variation graph M2-5 for the magnet array to which the disclosure is not applied is about 0.0315 V*s/m^2 in positions ② and ⑧, and the lowest value is about 0.0245 V*s/m^2 in position ⑤. The highest value of the magnetic field strength variation graph M2-6 for the magnet array 400-2 to which the disclosure is applied is about 0.0305 V*s/m^2 in positions ④ and ⑥, and the lowest value except for values near two opposite ends is about 0.0265 V*s/m^2 in position ⑤. As such, it may be identified that if the magnet array 400-2 according to an embodiment of the disclosure is applied, the deviation in magnetic field strength variation is reduced.

Figure 12A:
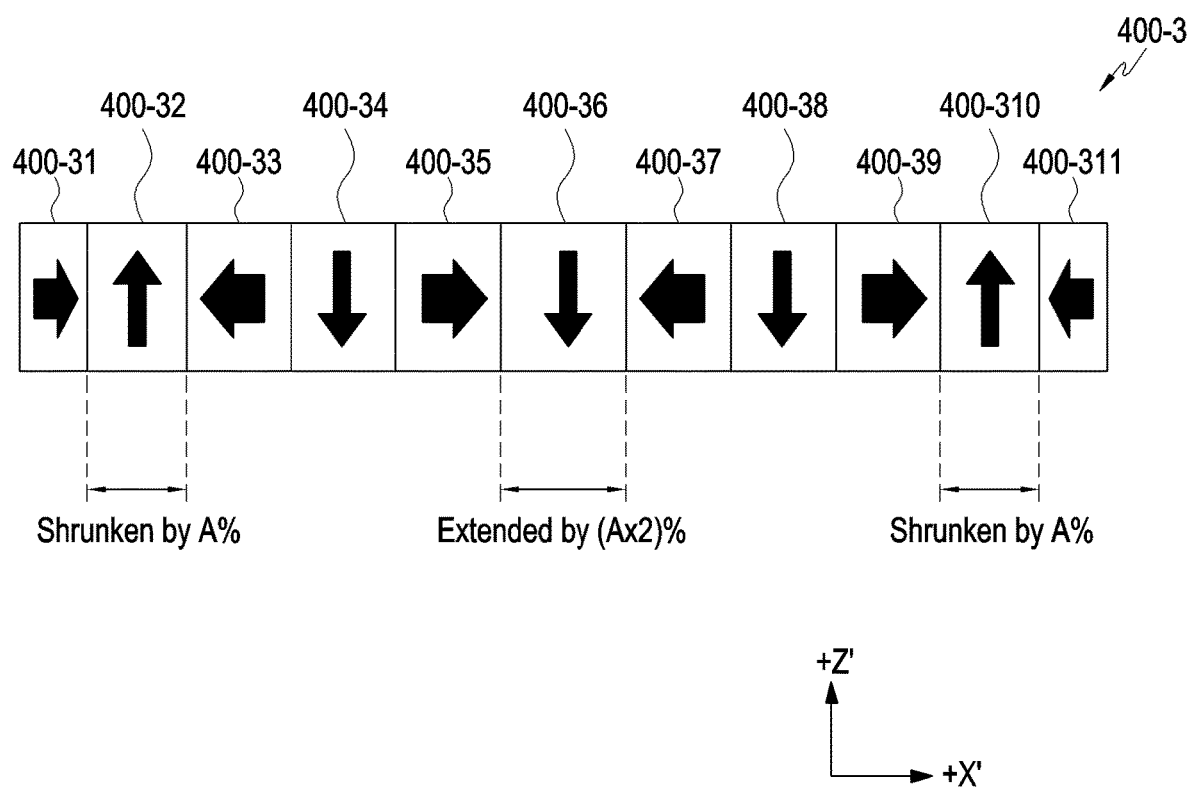
FIG. 12A illustrates a magnet array according to an embodiment of the disclosure.
Figure 12B:
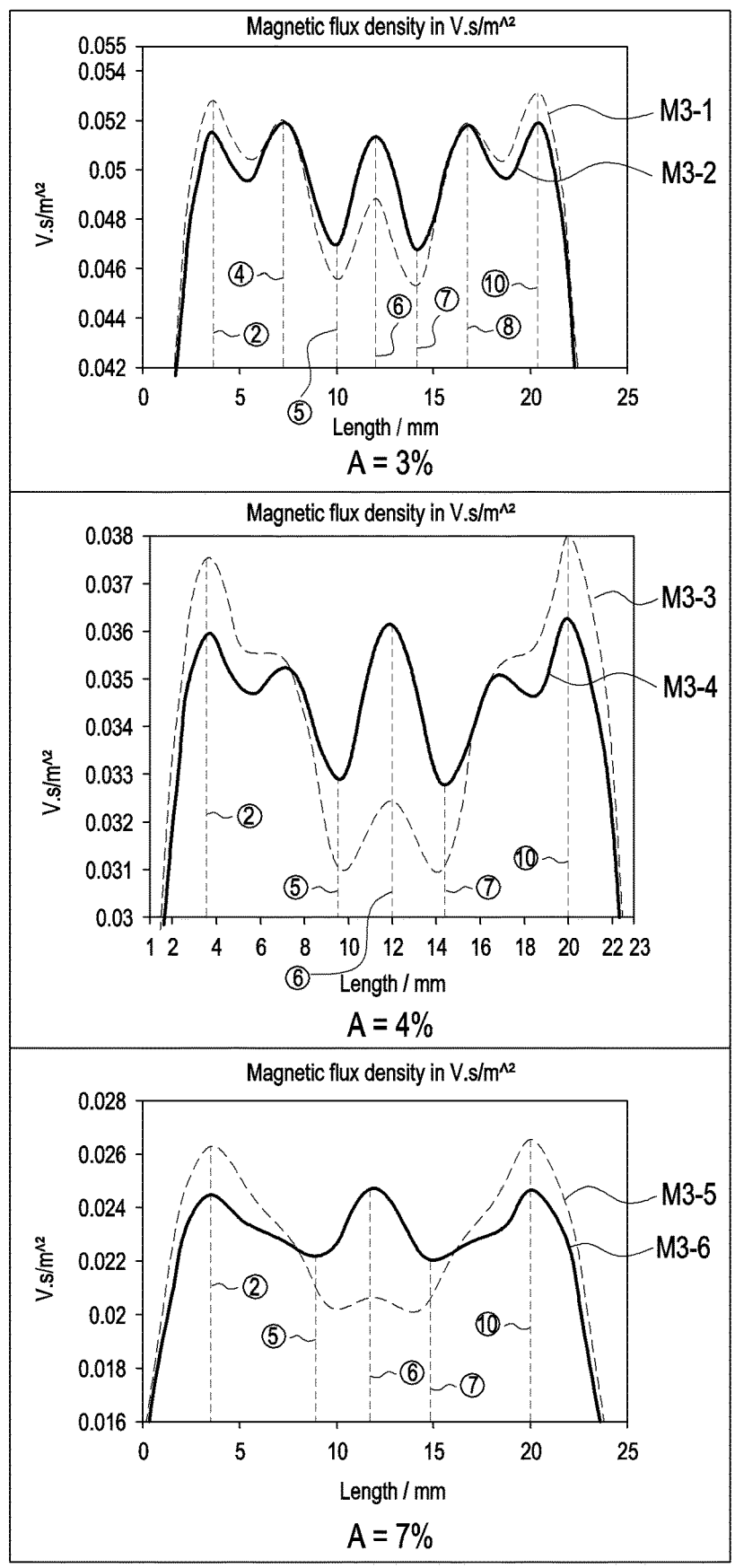
FIG. 12B illustrates a variation in the magnetic field of a magnet array according to an embodiment of the disclosure.

FIG. 12A illustrates a magnet array according to an embodiment of the disclosure. FIG. 12B illustrates a variation in the magnetic field of a magnet array according to an embodiment of the disclosure.

Since a third magnet array 400-3 disclosed in FIG. 12A is one of the embodiments of the magnetic member 400 illustrated in FIGS. 5 and 7, no duplicate description is given below.

Referring to FIG. 12A, according to an embodiment, the third magnet array 400-3 may include a 3-1th magnet component 400-31, a 3-2th magnet component 400-32, a 3-3th magnet component 400-33, a 3-4th magnet component 400-34, a 3-5th magnet component 400-35, a 3-6th magnet component 400-36, a 3-7th magnet component 400-37, a 3-8th magnet component 400-38, a 3-9th magnet component 400-39, a 3-10th magnet component 400-310, and a 3-11th magnet component 400-311.

According to an embodiment, the 3-1th magnet component 400-31 may be disposed such that the magnetic field direction is formed toward the +X' axis direction. The 3-2th magnet component 400-32 may be disposed so that the magnetic field direction is formed toward the +Z' axis direction. The 3-3th magnet component 400-33 may be disposed so that the magnetic field direction is formed toward the −X' axis direction. The 3-4th magnet component 400-34 may be disposed so that the magnetic field direction is formed toward the −Z' axis direction. The 3-5th magnet component 400-35 may be disposed so that the magnetic field direction is formed toward the +X' axis direction. The 3-6th magnet component 400-36 may be disposed so that the magnetic field direction is formed toward the +Z' axis direction. The 3-7th magnet component 400-37 may be disposed so that the magnetic field direction is formed toward the −X' axis direction. The 3-8th magnet component 400-38 may be disposed so that the magnetic field direction is formed toward the −Z' axis direction. The 3-9th magnet component 400-39 may be disposed so that the magnetic field direction is formed toward the +X' axis direction. The 3-10th magnet component 400-310 may be disposed so that the magnetic field direction is formed toward the +Z' axis direction. The 3-11th magnet component 400-311 may be disposed so that the magnetic field direction is formed toward the −X' axis direction.

According to an embodiment, the lengths in the X' axis direction of the 3-2th magnet component 400-32 and 3-10th magnet component 400-310 may be formed to be A % shorter than the lengths in the X' axis direction of the 3-3th magnet component 400-33, 3-4th magnet component 400-34, 3-5th magnet component 400-35, 3-7th magnet component 400-37, 3-8th magnet component 400-38, and 3-9th magnet component 400-39.

According to an embodiment, the length in the X' axis direction of 3-6th magnet component 400-36 may be formed to be 2*A % longer than the lengths in the X' axis direction of the 3-3th magnet component 400-33, 3-4th magnet component 400-34, 3-5th magnet component 400-35, 3-7th magnet component 400-37, 3-8th magnet component 400-38, and the 3-9th magnet component 400-39. The length change value A of the magnet component is not a fixed value but may vary. According to an embodiment, A may be larger than 0 and less than or equal to 15.

According to an embodiment, the lengths in the X' axis direction of the 3-1th magnet component 400-31 and 3-11th magnet component 400-311 may be half of the lengths in the X' axis direction of the 3-3th magnet component 400-33, 3-4th magnet component 400-34, 3-5th magnet component 400-35, 3-7th magnet component 400-37, 3-8th magnet component 400-38, and 3-9th magnet component 400-39.

Referring to FIG. 12B, according to an embodiment, the magnetic field strength variation graphs M3-1 and M3-2 are ones measured in positions about 3.5 mm away from the magnet array and the first magnet array 400-3. The variation A in the magnet component length in the magnetic field strength variation graph M3-1 is 0%, and the variation A in the magnet component length in the magnetic field strength variation graph M3-2 is about 3%.

According to an embodiment, ② may correspond to the position of the 3-2th magnet component 400-32, ⑤ may correspond to the position of the 3-5th magnet component 400-35, ⑥ may correspond to the position of the 3-6th magnet component 400-36, ⑦ may correspond to the position of the 3-7th magnet component 400-37, and ⑩ may correspond to the position of the 3-10th magnet component 400-310.

According to an embodiment, when the magnetic field strength M3-1 and the magnetic field strength M3-2 are compared, the deviation in the magnetic field strength M3-1 may be identified as larger than the deviation in the magnetic field strength M3-2. According to an embodiment, it may be identified that the maximum strength of the magnetic field strength M3-1 of the magnet array occurs at ② and ⑩, and the magnetic flux density is about 0.053 V*s/m^2. It may be identified that the minimum strength of the magnetic field strength M3-1 except for the values near two opposite ends occurs near positions ⑤ and ⑦, and the magnetic flux density is about 0.046 V*s/m^2. According to an embodiment, the maximum intensity of the magnetic field strength M3-2 of the third magnet array 400-3 occurs at ④ and ⑧, and the magnetic flux density is about 0.052 V*s/m^2. It may be identified that the minimum strength of the magnetic field strength M3-2 of the third magnet array 400-3 except for the values near two opposite ends occurs near positions ⑤ and ⑦, and the magnetic flux density is about 0.047 V*s/m^2. As such, according to an embodiment of the disclosure, the difference between the maximum intensity and the minimum intensity of the third magnet array 400-3 may be reduced, and the deviation in the third magnet array 400-3 may be reduced. Accordingly, the variation in inductance generated in the coil 1003 of the electronic pen 1000 may be reduced, and malfunctions of the electronic device 101 may be reduced.

According to an embodiment, the magnetic field strength variation graphs M3-3 and M3-4 are ones measured in the positions about 4.0 mm away from the magnetic member and the third magnet array 400-3, and the variation A in magnet component length in the magnetic field strength variation graph M3-3 is 0%, and the variation A in magnetic field length the length in the magnetic field strength variation graph M3-4 is about 4%. The highest value of the magnetic field strength variation graph M3-3 for the magnet array to which the disclosure is not applied is about 0.038 V*s/m^2 in positions ② and ⑩, and the lowest value except for values near two opposite ends is about 0.031 V*s/m^2. The highest value of the magnetic field strength variation graph M3-4 for the magnet array 400-2 to which the disclosure is applied is about 0.036 V*s/m^2 in position ⑥, and the lowest value except for values near two opposite ends is about 0.033 V*s/m^2 in positions ⑤ and ⑦. As such, it may be identified that if the magnet array 400-3 according to an embodiment of the disclosure is applied, the deviation in magnetic field strength variation is reduced.

According to an embodiment, the magnetic field strength variation graphs M3-5 and M3-6 are ones measured in positions about 4.5 mm away from the magnet array and the third magnet array 400-3. The variation A in the magnet component length in the magnetic field strength variation graph M3-5 is 0%, and the variation A in the magnet component length in the magnetic field strength variation graph M3-6 is about 9%. The highest value of the magnetic field strength variation graph M3-5 for the magnet array to which the disclosure is not applied is about 0.027 V*s/m^2 in positions ② and ⑩, and the lowest value is about 0.021 V*s/m^2 in positions ⑤ and ⑦. The highest value of the magnetic field strength variation graph M3-6 for the magnet array 400-3 to which the disclosure is applied is about 0.026 V*s/m^2 in positions ② and ⑩, and the lowest value except for values near two opposite ends is about 0.022 V*s/m^2 in positions ⑤ and ⑦. As such, it may be identified that if the magnet array 400-3 according to an embodiment of the disclosure is applied, the deviation in magnetic field strength variation is reduced.

According to an embodiment of the disclosure, an electronic device (e.g., the electronic device 101 of FIG. 1) may comprise a first housing (e.g., the first housing 310 of FIG. 2), a hinge structure (e.g., the hinge structure 302 of FIG. 4) disposed in at least a portion of the housing, a second housing (e.g., the second housing 320 of FIG. 2) connected to the hinge structure and providing a motion relative to the first housing, a flexible display (e.g., the flexible display 200 of FIG. 2) disposed from the first housing across the hinge structure to the second housing, at least one first magnetic member (e.g., the magnetic member 400 of FIG. 5) disposed on the first housing, and at least one second magnetic member (e.g., the magnetic member 400 of FIG. 5) disposed on the second housing to correspond to a position of the first magnetic member. Each of the first magnetic member and the second magnetic member may include at least one vertical magnet component perpendicular to the flexible display and at least one horizontal magnet component parallel to the flexible display. The at least one vertical magnet component may be formed to be longer than the horizontal magnet component.

According to an embodiment, the first magnetic member may include at least two magnetic members and is disposed between the flexible display and the first housing. The second magnetic member may include at least two magnetic members and is disposed between the flexible display and the second housing.

According to an embodiment, the first magnetic member and the second magnetic member may be arranged in parallel with each other along a length direction of the electronic device.

According to an embodiment, the first magnetic member may be disposed adjacent to an outer periphery of the first housing, and the second magnetic member is disposed adjacent to an outer periphery of the second housing.

According to an embodiment, each of the first magnetic member and the second magnetic member may include a plurality of vertical magnet components and a plurality of horizontal magnet components. The first magnetic member may include at least one long vertical magnet component (e.g., the 1-5th magnet component 400-15 of FIG. 10A) formed to be longer than the horizontal magnet component and at least one short vertical magnet component (e.g., the 1-3th magnet component 400-13 or the 1-7th magnet component 400-17 of FIG. 10A) formed to be shorter than the horizontal magnet component. The second magnetic member may include at least one long vertical magnet component formed to be longer than the horizontal magnet component and at least one short vertical magnet component formed to be shorter than the horizontal magnet component.

According to an embodiment, the long vertical magnet component may be formed to be 2A % longer than the horizontal magnet component, and the short vertical magnet component may be formed to be A % shorter than the horizontal magnet component. A may be larger than 0 and smaller than 10.

According to an embodiment, the first magnetic member and the second magnetic member may be arranged to allow an attractive force to act therebetween.

According to an embodiment, the electronic device may further comprise a digitizer module (e.g., the digitizer module 240 of FIG. 5) disposed between the first housing and the second housing and the flexible display.

According to an embodiment, the digitizer module may include a digitizer flexible printed circuit board (e.g., the digitizer flexible printed circuit board 241 of FIG. 5) and a digitizer shielding sheet (e.g., the digitizer shielding sheet 242 of FIG. 5).

According to an embodiment, the electronic device may further comprise a metal sheet (e.g., the metal sheet 243 of FIG. 5) disposed between the first housing and the second housing and the digitizer module.

According to an embodiment of the disclosure, an electronic device (e.g., the electronic device 101 of FIG. 1) may comprise a first housing (e.g., the first housing 310 of FIG. 2), a hinge structure (e.g., the hinge structure 302 of FIG. 4) disposed in at least a portion of the housing, a second housing (e.g., the second housing 320 of FIG. 2) connected to the hinge structure and providing a motion relative to the first housing, a flexible display (e.g., the flexible display 200 of FIG. 2) disposed from the first housing across the hinge structure to the second housing, at least one first magnetic member (e.g., the magnetic member 400 of FIG. 5) disposed on the first housing, and at least one second magnetic member (e.g., the magnetic member 400 of FIG. 5) disposed on the second housing to correspond to a position of the first magnetic member. Each of the first magnetic member and the second magnetic member may include at least one vertical magnet component perpendicular to the flexible display and at least one horizontal magnet component parallel to the flexible display. The at least one vertical magnet component may be formed to be longer than the horizontal magnet component. A length of the at least one horizontal magnet component may be formed to be half a length of another horizontal magnet component.

According to an embodiment, the first magnetic member may include at least two magnetic members and is disposed between the flexible display and the first housing. The second magnetic member may include at least two magnetic members and is disposed between the flexible display and the second housing.

According to an embodiment, the first magnetic member and the second magnetic member may be arranged in parallel with each other along a length direction of the electronic device.

According to an embodiment, the first magnetic member may be disposed adjacent to an outer periphery of the first housing, and the second magnetic member is disposed adjacent to an outer periphery of the second housing.

According to an embodiment, each of the first magnetic member and the second magnetic member may include a plurality of vertical magnet components and a plurality of horizontal magnet components. The first magnetic member may include at least one long vertical magnet component (e.g., the 1-5th magnet component 400-15 of FIG. 10A) formed to be longer than the horizontal magnet component and at least one short vertical magnet component (e.g., the 1-3th magnet component 400-13 or the 1-7th magnet component 400-17 of FIG. 10A) formed to be shorter than the horizontal magnet component. The second magnetic member may include at least one long vertical magnet component formed to be longer than the horizontal magnet component and at least one short vertical magnet component formed to be shorter than the horizontal magnet component.

According to an embodiment, the long vertical magnet component may be formed to be 2A % longer than the horizontal magnet component, and the short vertical magnet component may be formed to be A % shorter than the horizontal magnet component. A may be larger than 0 and smaller than 10.

According to an embodiment, the long vertical magnet component may be formed to be A % longer than the horizontal magnet component, and the short vertical magnet component may be formed to be A % shorter than the horizontal magnet component.

According to an embodiment, the electronic device may further comprise a digitizer module (e.g., the digitizer module 240 of FIG. 5) disposed between the first housing and the second housing and the flexible display.

According to an embodiment, the digitizer module may include a digitizer flexible printed circuit board (e.g., the digitizer flexible printed circuit board 241 of FIG. 5) and a digitizer shielding sheet (e.g., the digitizer shielding sheet 242 of FIG. 5).

According to an embodiment, the electronic device may further comprise a metal sheet (e.g., the metal sheet 243 of FIG. 5) disposed between the first housing and the second housing and the digitizer module.

According to an embodiment, the electronic device may further comprise a pen driving circuit (e.g., the pen driving circuit 500 of FIG. 5) configured to transmit an electromagnetic field signal.

According to an embodiment, the electromagnetic field signal generated from the pen driving circuit may resonate a resonance circuit of an electronic pen (e.g., the electronic pen 1000 of FIG. 5) connected to the electronic device through a wireless communication module.

According to an embodiment, the resonance circuit of the electronic pen may radiate an electromagnetic resonance (EMR) input signal by resonance.

According to an embodiment, the electronic device may identify a position of the electronic pen over the electronic device by using the electromagnetic resonance (EMR) input signal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a first housing;
    a second housing;
    a hinge structure connected to the first housing and the second housing;
    a flexible display disposed from the first housing across the hinge structure to the second housing;
    at least one first magnetic member disposed on the first housing; and
    at least one second magnetic member disposed at a position on the second housing corresponding to a position of the first magnetic member,
    wherein each of the first magnetic member and the second magnetic member includes at least one vertical magnet component perpendicular to the flexible display and at least one horizontal magnet component parallel to the flexible display, and disposed separately from the at least one vertical magnet component, and
    wherein the at least one vertical magnet component is longer than the at least one horizontal magnet component.

2. The electronic device of claim 1,
    wherein the first magnetic member includes at least two magnetic members and is disposed between the flexible display and the first housing, and
    wherein the second magnetic member includes at least two magnetic members and is disposed between the flexible display and the second housing.

3. The electronic device of claim 2, wherein the first magnetic member and the second magnetic member are arranged in parallel with each other along a length (Y-axis) direction of the electronic device.

4. The electronic device of claim 1,
    wherein the first magnetic member is disposed adjacent to an outer periphery of the first housing, and
    wherein the second magnetic member is disposed adjacent to an outer periphery of the second housing.

5. The electronic device of claim 1,
    wherein each of the first magnetic member and the second magnetic member includes a plurality of vertical magnet components and a plurality of horizontal magnet components,
    wherein the first magnetic member includes at least one long vertical magnet component which is longer than the at least one horizontal magnet component and at least one short vertical magnet component which is shorter than the at least one horizontal magnet component, and
    wherein the second magnetic member includes at least one long vertical magnet component which is longer than the at least one horizontal magnet component and at least one short vertical magnet component which is shorter than the at least one horizontal magnet component.

6. The electronic device of claim 5,
    wherein the long vertical magnet component is 2A % longer than the at least one horizontal magnet component,
    wherein the short vertical magnet component is A % shorter than the at least one horizontal magnet component, and
    wherein A is greater than 0 and less than 10.

7. The electronic device of claim 1, wherein the first magnetic member and the second magnetic member are arranged to allow an attractive force to act therebetween.

8. The electronic device of claim 1, further comprising a digitizer module disposed between the first housing and the flexible display and between the second housing and the flexible display.

9. The electronic device of claim 8, wherein the digitizer module includes a digitizer flexible printed circuit board and a digitizer shielding sheet.

10. The electronic device of claim 8, further comprising a metal sheet disposed between the first housing and the digitizer module and between the second housing and the digitizer module.

11. An electronic device comprising:
    a first housing;
    a second housing;
    a hinge structure connected to the first housing and the second housing;
    a flexible display disposed from the first housing across the hinge structure to the second housing;
    at least one first magnetic member disposed on the first housing; and
    at least one second magnetic member disposed at a position on the second housing corresponding to a position of the first magnetic member,
    wherein each of the first magnetic member and the second magnetic member includes at least one vertical magnet component perpendicular to the flexible display and at least one horizontal magnet component parallel to the flexible display, and disposed separately from the at least one vertical magnet component, wherein the at least one vertical magnet component is longer than the at least one horizontal magnet component, and wherein a length of the at least one horizontal magnet component is half a length of another horizontal magnet component.

12. The electronic device of claim 11, wherein the first magnetic member includes at least two magnetic members and is disposed between the flexible display and the first housing, and wherein the second magnetic member includes at least two magnetic members and is disposed between the flexible display and the second housing.

13. The electronic device of claim 12, wherein the first magnetic member and the second magnetic member are arranged in parallel with each other along a length Y-axis) direction of the electronic device.

14. The electronic device of claim 11, wherein the first magnetic member is disposed adjacent to an outer periphery of the first housing, and wherein the second magnetic member is disposed adjacent to an outer periphery of the second housing.

15. The electronic device of claim 11, wherein each of the first magnetic member and the second magnetic member includes a plurality of vertical magnet components and a plurality of horizontal magnet components, wherein the first magnetic member includes at least one long vertical magnet component which is longer than the at least one horizontal magnet component and at least one short vertical magnet component which is shorter than the at least one horizontal magnet component, and wherein the second magnetic member includes at least one long vertical magnet component which is longer than the at least one horizontal magnet component and at least one short vertical magnet component which is shorter than the at least one horizontal magnet component.

16. The electronic device of claim 15, wherein the long vertical magnet component is formed to be 2A % longer than the at least one horizontal magnet component, and wherein the short vertical magnet component is formed to be A % shorter than the at least one horizontal magnet component.

17. The electronic device of claim 15, wherein the long vertical magnet component is A % longer than the at least one horizontal magnet component, wherein the short vertical magnet component is A % shorter than the at least one horizontal magnet component, and wherein A is greater than 0 and less than 10.

18. The electronic device of claim 11, further comprising a digitizer module disposed between the first housing and the flexible display and between the second housing and the flexible display.

19. The electronic device of claim 18, wherein the digitizer module includes a digitizer flexible printed circuit board and a digitizer shielding sheet.

20. The electronic device of claim 18, further comprising a metal sheet disposed between the first housing and the digitizer module and between the second housing and the digitizer module.

* * * * *